(12) United States Patent
Suzuki

(10) Patent No.: US 12,354,408 B2
(45) Date of Patent: Jul. 8, 2025

(54) NON-TRANSITORY COMPUTER-READABLE RECORDING MEDIUM, INFORMATION PROCESSING METHOD, AND INFORMATION PROCESSING APPARATUS

(71) Applicant: Fujitsu Limited, Kawasaki (JP)

(72) Inventor: Genta Suzuki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 391 days.

(21) Appl. No.: 17/873,295

(22) Filed: Jul. 26, 2022

(65) Prior Publication Data

US 2023/0033213 A1 Feb. 2, 2023

(30) Foreign Application Priority Data

Jul. 30, 2021 (JP) .................. 2021-126299

(51) Int. Cl.
| | |
|---|---|
| *G06V 40/20* | (2022.01) |
| *G06Q 30/016* | (2023.01) |
| *G06Q 30/02* | (2023.01) |
| *G06T 7/246* | (2017.01) |
| *G06V 10/25* | (2022.01) |
| *H04L 51/043* | (2022.01) |

(52) U.S. Cl.
CPC .......... *G06V 40/23* (2022.01); *G06Q 30/016* (2013.01); *G06Q 30/0281* (2013.01); *G06T 7/251* (2017.01); *G06V 10/25* (2022.01); *H04L 51/043* (2013.01); *G06T 2207/30196* (2013.01)

(58) Field of Classification Search
None
See application file for complete search history.

(56) References Cited

U.S. PATENT DOCUMENTS

2016/0196575 A1* 7/2016 Uchida ............ G06Q 30/0255
 705/14.45
2024/0211976 A1* 6/2024 Ishibashi ............ G06V 40/20

FOREIGN PATENT DOCUMENTS

| JP | 2009-48430 A | 3/2009 |
| JP | 2015-141572 A | 8/2015 |
| JP | 2017-102574 A | 6/2017 |
| WO | WO-2020184855 A1 * | 9/2020 ......... G06K 9/00335 |

(Continued)

OTHER PUBLICATIONS

Office Action issued on Apr. 4, 2023, in corresponding Japanese patent Application No. 2021-126299, 5 pages.

(Continued)

*Primary Examiner* — Ian L Lemieux
*Assistant Examiner* — Promotto Tajrian Islam
(74) *Attorney, Agent, or Firm* — XSENSUS LLP

(57) ABSTRACT

An information processing apparatus detects a person and a commodity product from image data. The information processing apparatus acquires, from the image data, a position of a skeleton of the person included in skeleton information on the detected person. The information processing apparatus specifies, based on the position of the skeleton of the person, a behavior of the person exhibiting with respect to the commodity product. The information processing apparatus specifies, based on the specified behavior of the person exhibiting with respect to the commodity product, a combination of an attribute of the commodity product and a degree of interest in the commodity product.

10 Claims, 27 Drawing Sheets

(56) References Cited

FOREIGN PATENT DOCUMENTS

WO     WO-2021049300 A1 *   3/2021   ......... G06Q 30/0201

OTHER PUBLICATIONS

Extended European search report issued on Dec. 14, 2022, in corresponding European patent Application No. 22187187.4, 10 pages.

Hyunwoo Hwangbo et al., "Use of the Smart Store for Persuasive Marketing and Immersive Customer Experiences: A Case Study of Korean Apparel Enterprise", Hindawi, Mobile Information Systems, vol. 2017, Article ID 4738340, 2017, pp. 1-17, total 18 pages.

* cited by examiner

FIG.3

| CAMERA ID | SELLING SECTION |
|---|---|
| 1 | BABY GOODS SELLING SECTION |
| 2 | SPORTING GOODS SELLING SECTION |
| 3 | FURNITURE SELLING SECTION: BED |
| 4 | FURNITURE SELLING SECTION: SHELVES |
| ... | ... |

FIG.4

| SELLING SECTION | COMMODITY PRODUCT SIZE | COMMODITY PRODUCT EXAMPLE | COMMODITY PRODUCT ID |
|---|---|---|---|
| BABY GOODS SELLING SECTION | SMALL | SMALL GOODS | 242... |
| BABY GOODS SELLING SECTION | MEDIUM | BABY SLING | ... |
| BABY GOODS SELLING SECTION | LARGE | BABY BUGGY | ... |
| ... | | | ... |

FIG.5

| PURCHASE TIME | COMMODITY PRODUCT ID |
|---|---|
| 11:01:56 | 2420496 |
| 11:15:23 | 4353243 |
| 11:34:19 | 4353243 |
| 11:55:04 | 4352351 |
| ... | |
| 19:57:35 | 3563432 |

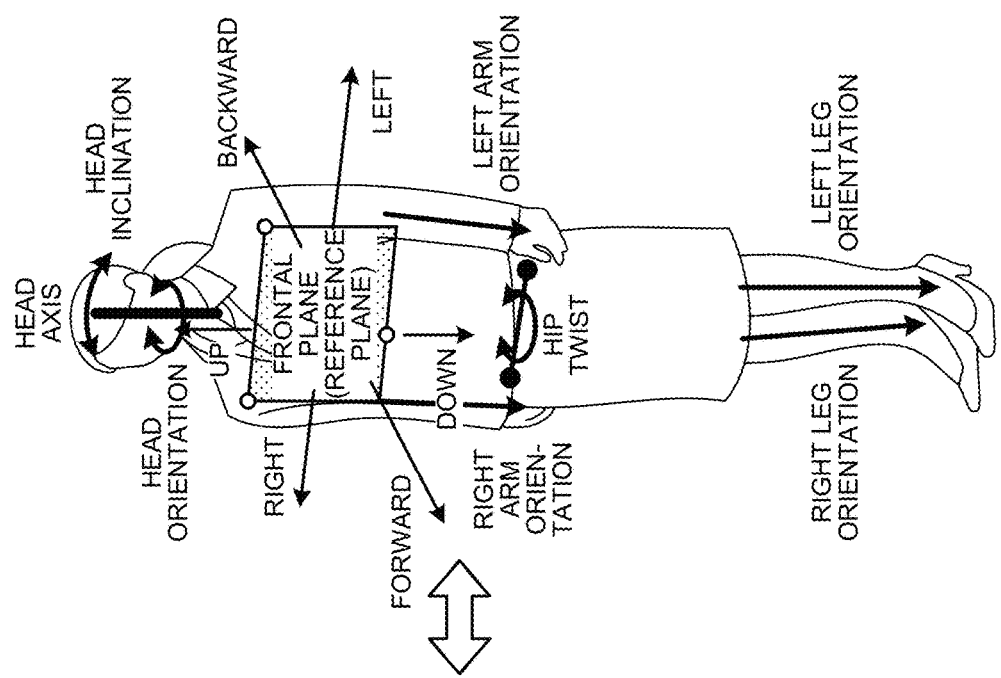

FIG.9

| BODY PART | STATE OF MOTION (TYPE) | DETERMINATION METHOD |
|---|---|---|
| FACE | ORIENTATION (FORWARD, LEFT, RIGHT, UP, DOWN: 5 TYPES) | EACH ORIENTATION IS DETERMINED BY FACE ORIENTATION AND BASED ON WHETHER EACH DIRECTION VECTOR ANGLE IS LESS THAN OR EQUAL TO THRESHOLD |
| | ORIENTATION (BACKWARD: 1 TYPE) | DETECTED BY (FACE FACING RIGHT AND HIPS TWISTING RIGHT) OR (FACE FACING LEFT AND HIPS TWISTING LEFT) |
| ARM (LEFT/RIGHT) | ORIENTATION (FORWARD, BACKWARD, LEFT, RIGHT, UP, DOWN: 6 TYPES) | EACH ORIENTATION IS DETERMINED BY FOREARM ORIENTATION AND BASED ON WHETHER EACH DIRECTION VECTOR ANGLE IS LESS THAN OR EQUAL TO THRESHOLD |
| LEG (LEFT/RIGHT) | ORIENTATION (FORWARD, BACKWARD, LEFT, RIGHT, UP, DOWN: 6 TYPES) | EACH ORIENTATION IS DETERMINED BY LOWER LEG ORIENTATION AND BASED ON WHETHER EACH DIRECTION VECTOR ANGLE IS LESS THAN OR EQUAL TO THRESHOLD |
| ELBOW (LEFT/RIGHT) | BEND/EXTEND (BENDING, EXTENDING: 2 TYPES) | DETERMINED AS EXTENDING WHEN ELBOW ANGLE IS GREATER THAN OR EQUAL TO THRESHOLD, AND AS BENDING WHEN ANGLE IS LESS THAN THRESHOLD |
| KNEE (LEFT/RIGHT) | BEND/EXTEND (BENDING, EXTENDING: 2 TYPES) | DETERMINED AS EXTENDING WHEN KNEE ANGLE IS GREATER THAN OR EQUAL TO THRESHOLD, AND AS BENDING WHEN ANGLE IS LESS THAN THRESHOLD |
| HIP | TWIST (FRONT, LEFT, RIGHT: 3 TYPES) | DETERMINED AS RIGHT/LEFT TWIST WHEN ANGLE OF EACH HIPS AND SHOULDERS IS GREATER THAN OR EQUAL TO THRESHOLD, AND AS FORWARD WHEN ANGLE IS LESS THAN THRESHOLD |

| MOTION ID | MOTION NAME | COMMODITY PRODUCT SIZE | DEGREE OF INTEREST | BASIC MOTION TRANSITION |
|---|---|---|---|---|
| A | LOOKING | LARGE, MEDIUM, AND SMALL | LEVEL 1 INTEREST | LOOKING AT FRONT FOR CERTAIN PERIOD OF TIME & UNMOVING & ENTIRE BODY POSTURE (STANDING UP, BENDING DOWN, OR SQUATTING DOWN) |
| B | PICKING UP BY HAND (SMALL) | SMALL | LEVEL 2 DESIRE | PUTTING ONE HAND FORWARD & EXTENDING ONE ARM & LOOKING AT ONE HAND ⇨ BENDING ONE ARM |
| C | PICKING UP BY HAND (MEDIUM) | MEDIUM | LEVEL 2 DESIRE | EXTENDING ONE ARM & LOOKING AT ONE HAND |
| D | TRYING (SMALL) | SMALL | LEVEL 3 COMPARE | WRIST COORDINATES FREQUENTLY MOVE FOR CERTAIN PERIOD OF TIME |
| E | TRYING (MEDIUM) | MEDIUM | LEVEL 3 COMPARE | ELBOW AND WRIST COORDINATES FREQUENTLY MOVE FOR CERTAIN PERIOD OF TIME |
| F | TRYING (LARGE) | LARGE | LEVEL 3 COMPARE | BODY ORIENTATION AND ENTIRE BODY MOTION FREQUENTLY CHANGE FOR CERTAIN PERIOD OF TIME |

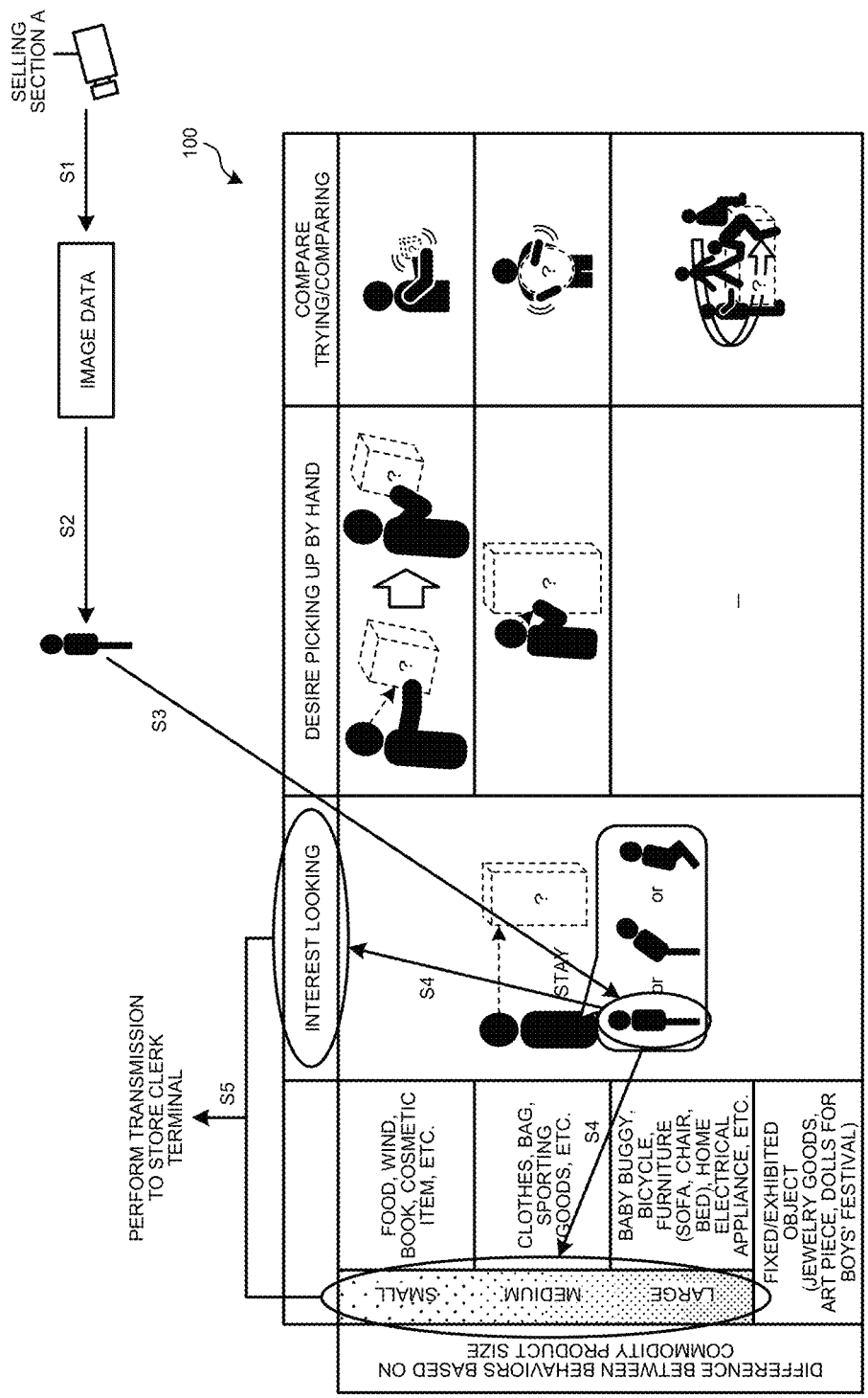

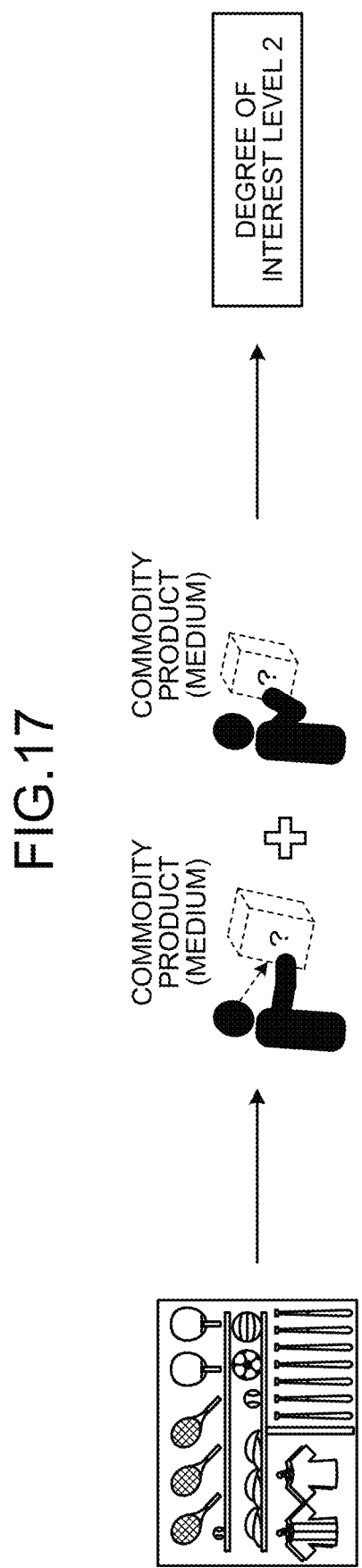

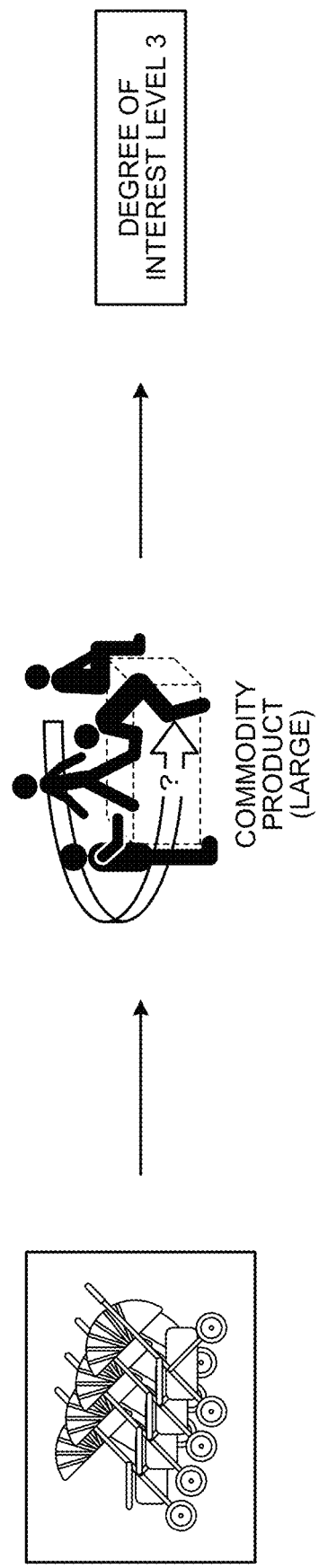

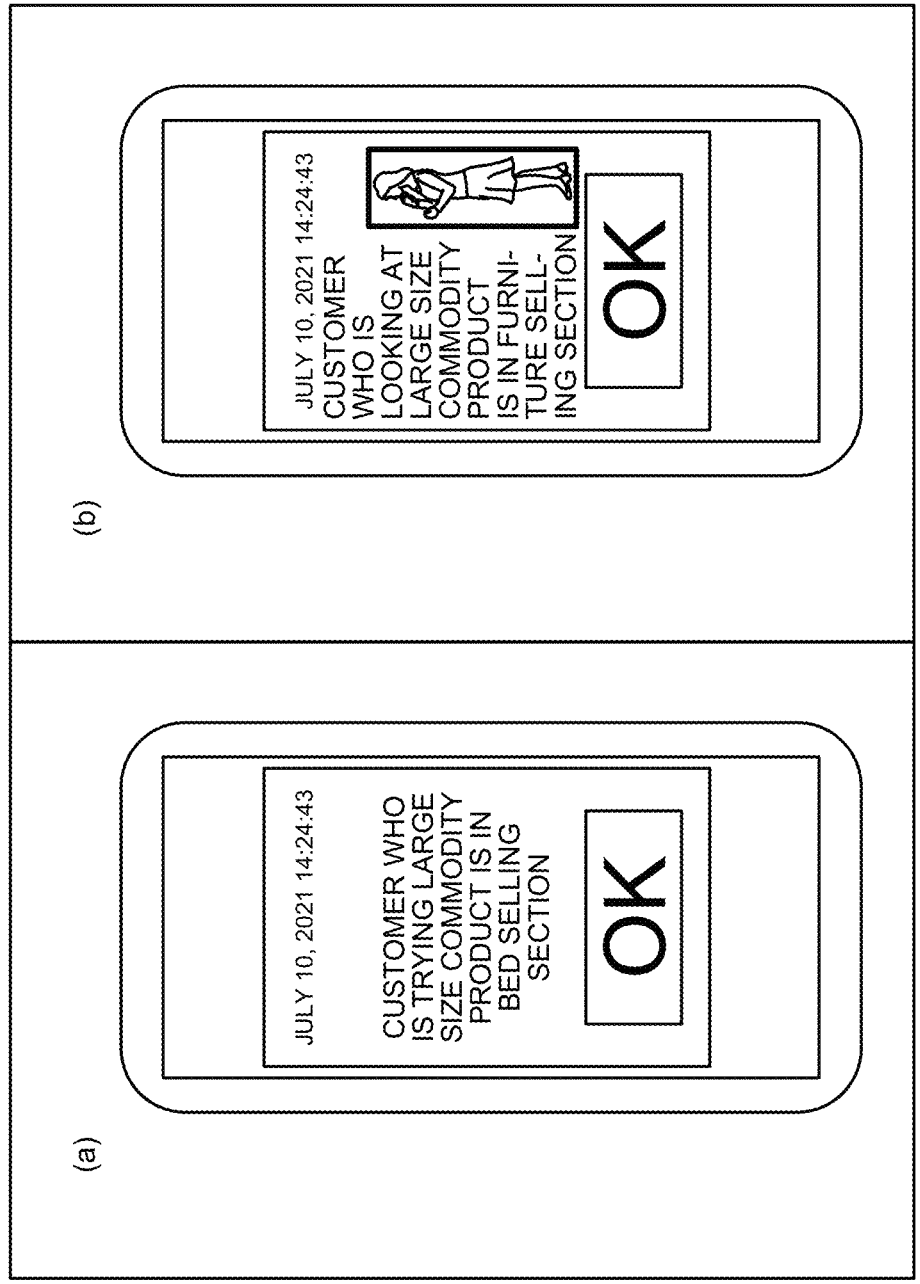

NON-TRANSITORY COMPUTER-READABLE RECORDING MEDIUM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2021-126299, filed on Jul. 30, 2021, the entire contents of which are incorporated herein by reference.

FIELD

The embodiments discussed herein are related to an information processing program, an information processing method, and an information processing apparatus.

BACKGROUND

There is a known technique for detecting a behavior of a person expressing a great interest in a commodity product. For example, there are known technologies including a technology for determining whether or not a customer picks up a commodity product by hand and looks at the commodity product, in particular, looks at the label of the commodity product, a technology for determining, from a video image, a customer extends one's hand to which position of a shelf, a technology for judging a motion of a customer extending one's hand to a commodity product, a motion of putting a commodity product into a shopping cart, and the like by performing pose estimation.

Patent Document 1: Japanese Laid-open Patent Publication No. 2009-48430

SUMMARY

According to an aspect of an embodiment, a non-transitory computer-readable recording medium stores therein an information processing program that causes a computer to execute a process. The process includes detecting a person and a commodity product from image data, acquiring, from the image data, a position of a skeleton of the person included in skeleton information on the detected person, specifying, based on the position of the skeleton of the person, a behavior of the person exhibiting with respect to the commodity product, and specifying, based on the specified behavior of the person exhibiting with respect to the commodity product, a combination of an attribute of the commodity product and a degree of interest in the commodity product.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of information stored in a camera installation DB;

FIG. 4 is a diagram illustrating an example of information stored in a commodity product DB;

FIG. 5 is a diagram illustrating an example of information stored in a POS data DB;

FIG. 9 is a diagram illustrating detection of a part category motion;

FIG. 10A is a diagram illustrating a detection rule;

FIG. 10B is a diagram illustrating the detection rule indicated by using data;

FIG. 16A is a diagram illustrating a detection example 1 according to the second embodiment;

FIG. 17 is a diagram illustrating a detection example 2 according to the second embodiment;

FIG. 18 is a diagram illustrating a detection example 3 according to the second embodiment;

FIG. 19 is a diagram illustrating an example of a notification sent to a store clerk;

DESCRIPTION OF EMBODIMENTS

Figure 1:
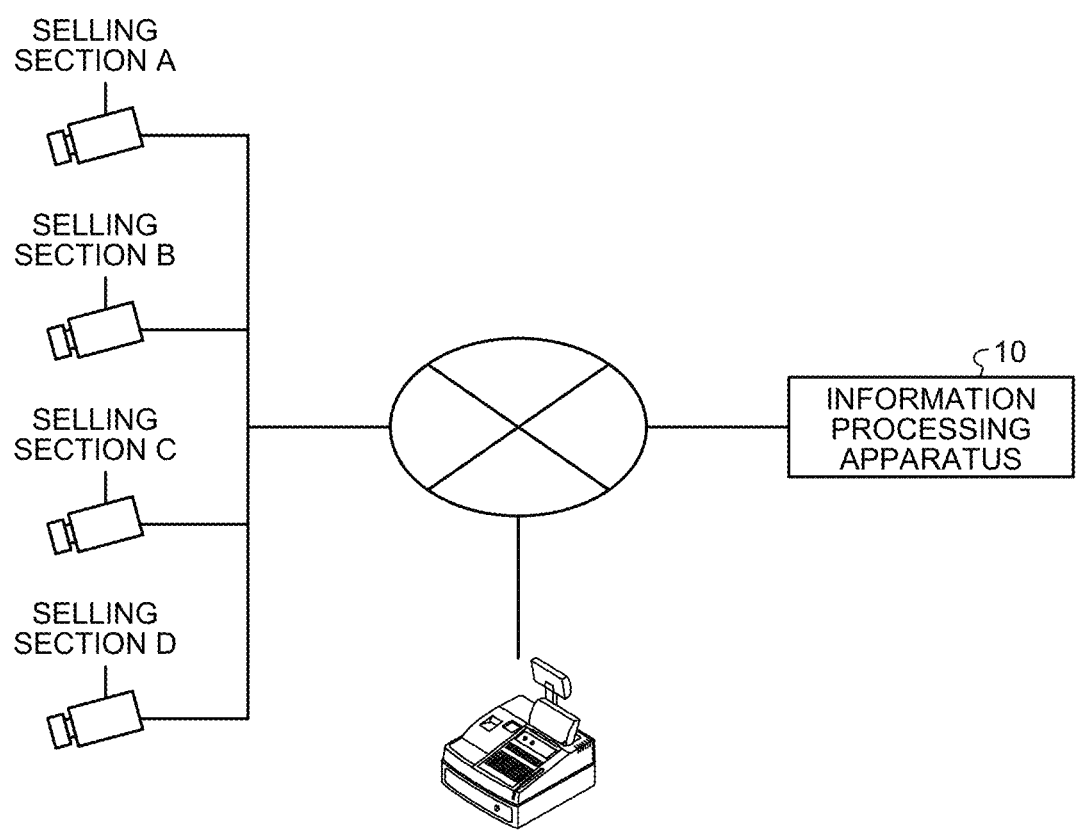
FIG. 1 is a diagram illustrating an example of the overall configuration of a detection rule generation system according to a first embodiment.

However, with the technologies described above, there is a need to generate a detection rule for each commodity product in order to detect a customer highly effective in customer service; however, it takes time and effort to manually generate the detection rule for each of the huge number of commodity products. Therefore, this process is unrealistic and it is thus difficult to detect a customer highly effective in customer service.

Specifically, a behavior of the person exhibiting with respect to a commodity product attractive for the customer varies in accordance with each of the commodity products, and thus, there is a need to generate a rule for each commodity product, but, realistically, it is difficult to generate the rules due to a massive number of commodity product. For example, if a commodity product is a bicycle, it is conceivable to generate a rule for detecting a behavior of riding the bicycle, a behavior of holding handlebars of the bicycle, or the like. In contrast, if a commodity product is a sofa, it is conceivable to generate a rule for detecting a behavior of sitting down the sofa, and, if a commodity product is a cosmetic item, there is a need to further generate another rule.

Preferred embodiments will be explained with reference to accompanying drawings. Furthermore, the present invention is not limited to the embodiments. In addition, each of the embodiments can be used in any appropriate combination as long as they do not conflict with each other.

[a] First Embodiment

Overall Configuration

In various stores providing, for example, food items, furniture, stationery, or the like, customers who visit the stores includes a customer who is considering purchasing a commodity product, a customer who desires to ask for further detailed information in case of a purchase but a store clerk is not present nearby, a customer who is not good at talking to a store clerk on one's own initiative, or the like. The customers who are interested in this kind of commodity products sometimes indicate high purchase willingness, so that it is possible for the stores to increase the number of items to be purchased by proactively providing a customer service to the customers. As a result, the customers are able to make a purchase after having received an explanation, and thus, an advantage is provided on both of the store and the customer sides.

In contrast, a behavior of a person interested in a commodity product varies, so that, in order to detect this type of a customer highly effective in customer service, there is a need to generate a rule for each commodity product; however, this is unrealistic. Accordingly, in a first embodiment, by using a past behavior, information indicating whether or not a commodity product has been purchased, or the like, and by using a detection rule in which behaviors in several stages (for example, three stages) determined on the basis of the degree of interest in a commodity product is defined as a combination of basic motions, a customer highly effective in customer service is detected without depending on the commodity product.

FIG. 1 is an example illustrating an example of the overall configuration of a detection rule generation system according to the first embodiment. As illustrated in FIG. 1, in this system, each of cameras installed in a selling section A, a selling section B, a selling section C, and a selling section D, a camera installed in a checkout counter (a POS device), and an information processing apparatus 10 are connected with each other via a network, such as the Internet, regardless of a wired or wireless connection.

Each of the cameras installed in the respective selling sections is installed at a position in which images of the commodity products placed in the respective selling sections are able to be captured, captures image data, moving image data, video image data, or the like, and periodically transmits the data to the information processing apparatus 10. Furthermore, a commodity product ID that specifies a commodity product and the coordinates that specify a position of the commodity product are allocated to each of the commodity products that are placed in a region captured by the respective cameras, and control is performed such that a type and a position of each of the commodity products are able to be specified.

The POS device periodically transmits a purchase history of a commodity product to the information processing apparatus 10. For example, the POS device transmits POS data in which purchase time and a commodity product ID are associated with each other to the information processing apparatus 10.

The information processing apparatus 10 is an example of a computer device that analyzes the image data received from the camera installed in each of the selling sections, that specifies information indicating what kind of behavior was exhibited by a customer when a commodity product was purchased by the customer or specifies whether a customer became interested in a commodity product, and that generates a detection rule for detecting a customer highly effective in customer service.

Specifically, the information processing apparatus 10 acquires each of the pieces of image data captured in a period of time between a point at which a person enters a store and a point at which the person leaves the store, and specifies, on the basis of each of the pieces of image data, the behaviors of the person exhibiting with respect to the commodity products placed in the store in a period of time between a point at which the person enters the store and a point at which the person leave the store. Then, the information processing apparatus 10 determines, on the basis of each of the specified behaviors, the degree of interest of the person in the commodity product, and generates a detection rule in which the determined degree of interest is associated with the commodity product.

In this way, by generating the detection rule without dependence on the commodity product, the information processing apparatus 10 is able to detect a customer highly effective in customer service without performing complicated analysis on the image data obtained when the customer visits the store and without performing a huge amount of behavior recognition.

Functional Configuration

Figure 2:
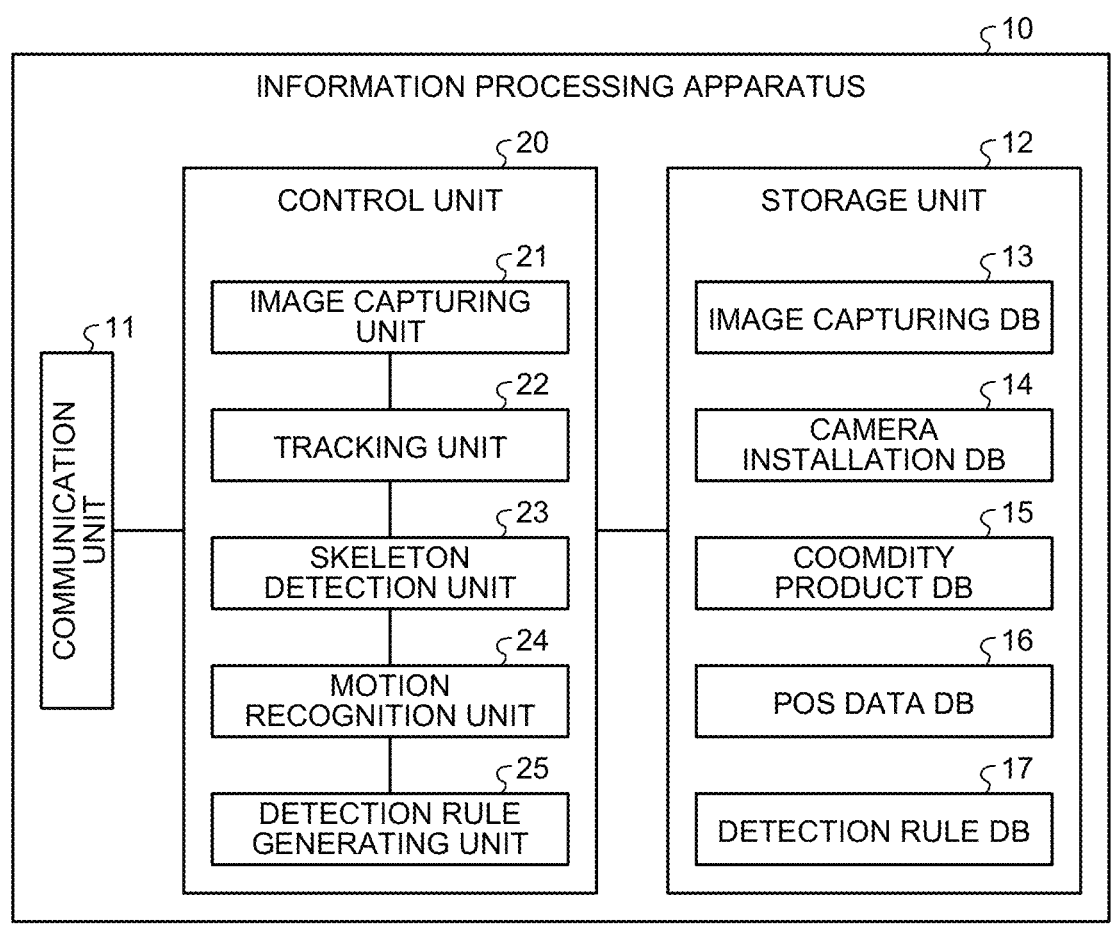
FIG. 2 is a functional block diagram illustrating a functional configuration of an information processing apparatus according to the first embodiment.

FIG. 2 is a functional block diagram illustrating a functional configuration of the information processing apparatus 10 according to the first embodiment. As illustrated in FIG. 2, the information processing apparatus 10 includes a communication unit 11, a storage unit 12, and a control unit 20.

The communication unit 11 is a processing unit that controls communication between another device and is implemented by, for example, a communication interface or the like. For example, the communication unit 11 receives moving image data (for example, image data) from each of the cameras and receives POS data from the POS device.

The storage unit 12 is an example of a storage device that stores therein various kinds of data, a program executed by the control unit 20, or the like and is implemented by, for example, a memory, a hard disk, or the like. The storage unit 12 stores therein an image capturing DB 13, a camera installation DB 14, a commodity product DB 15, a POS data DB 16, and a detection rule DB 17.

The image capturing DB 13 is a database that stores therein, for each camera, various kinds of data captured by each of the cameras. In the present embodiment, the image capturing DB 13 stores therein image data captured by each of the cameras.

The camera installation DB 14 is a database that stores therein information for specifying a location in which each of the camera is installed. The information stored here is set by an administrator or the like. FIG. 3 is a diagram illustrating an example of information stored in the camera installation DB 14. As illustrated in FIG. 3, the camera installation DB 14 stores therein, in an associated manner, "camera ID and selling section". In the "camera ID" stored here, information for identifying a camera is set, and, in the "selling section", information for specifying a selling section in which a camera is installed is set. In the example illustrated in FIG. 3, an example in which a camera with the camera ID=1 is installed in a baby goods selling section and a camera with the camera ID=2 is installed in a sporting goods selling section.

The commodity product DB 15 is a database that stores therein information related to the commodity products placed in each of the selling sections. The information stored here is set by an administrator or the like. FIG. 4 is a diagram illustrating an example of information stored in the commodity product DB 15. As illustrated in FIG. 4, the commodity product DB 15 stores therein, in an associated manner, "selling section, commodity product size, commodity product example, and commodity product ID". In the "selling section" stored here, information for specifying a selling section is set; in the "commodity product size", information related to the size of a commodity product is set; in the "commodity product example", an example of the associated commodity product is set; and, in the "commodity product ID", information for specifying a commodity product is set. The example illustrated in FIG. 4 indicates that "242 . . . " is set, as the commodity product ID, to a small item corresponding to a small size commodity product placed in the baby goods selling section.

The POS data DB 16 is a database that stores therein the received POS data. FIG. 5 is a diagram illustrating an example of information stored in the POS data DB 16. As illustrated in FIG. 5, the POS data DB 16 stores therein, in an associated manner, "purchase time and commodity product ID". In the "purchase time" stored here, the time at which a commodity product was purchased is set, and, in the "commodity product ID", information for specifying the commodity product is set. The example illustrated in FIG. 5 indicates that the commodity product with the commodity product ID of "2420496" was purchased at "11:01:56".

The detection rule DB 17 is a database that stores therein the detection rule generated by the information processing apparatus 10. Furthermore, a detail of the detection rule will be described later.

The control unit 20 is a processing unit that manages the entire of the information processing apparatus 10 and is implemented by, for example, a processor or the like. The control unit 20 includes an image capturing unit 21, a tracking unit 22, a skeleton detection unit 23, a motion recognition unit 24, and a detection rule generating unit 25.

The image capturing unit 21 is a processing unit that captures an image. For example, the image capturing unit 21 receives image data on an image captured by each of the cameras and stores the received image data in the image capturing DB 13.

The tracking unit 22 is a processing unit that acquires each of the pieces of image data on the images captured in a period of time between a point at which a person enters the store and a point at which the person leaves the store. Specifically, the tracking unit 22 extracts, from a plurality of pieces of image data captured by each of the cameras, the pieces of image data in each of which a commodity product and a person are captured, and outputs the extracted image data to the skeleton detection unit 23 or stores the extracted image data in the storage unit 12.

Figure 6:
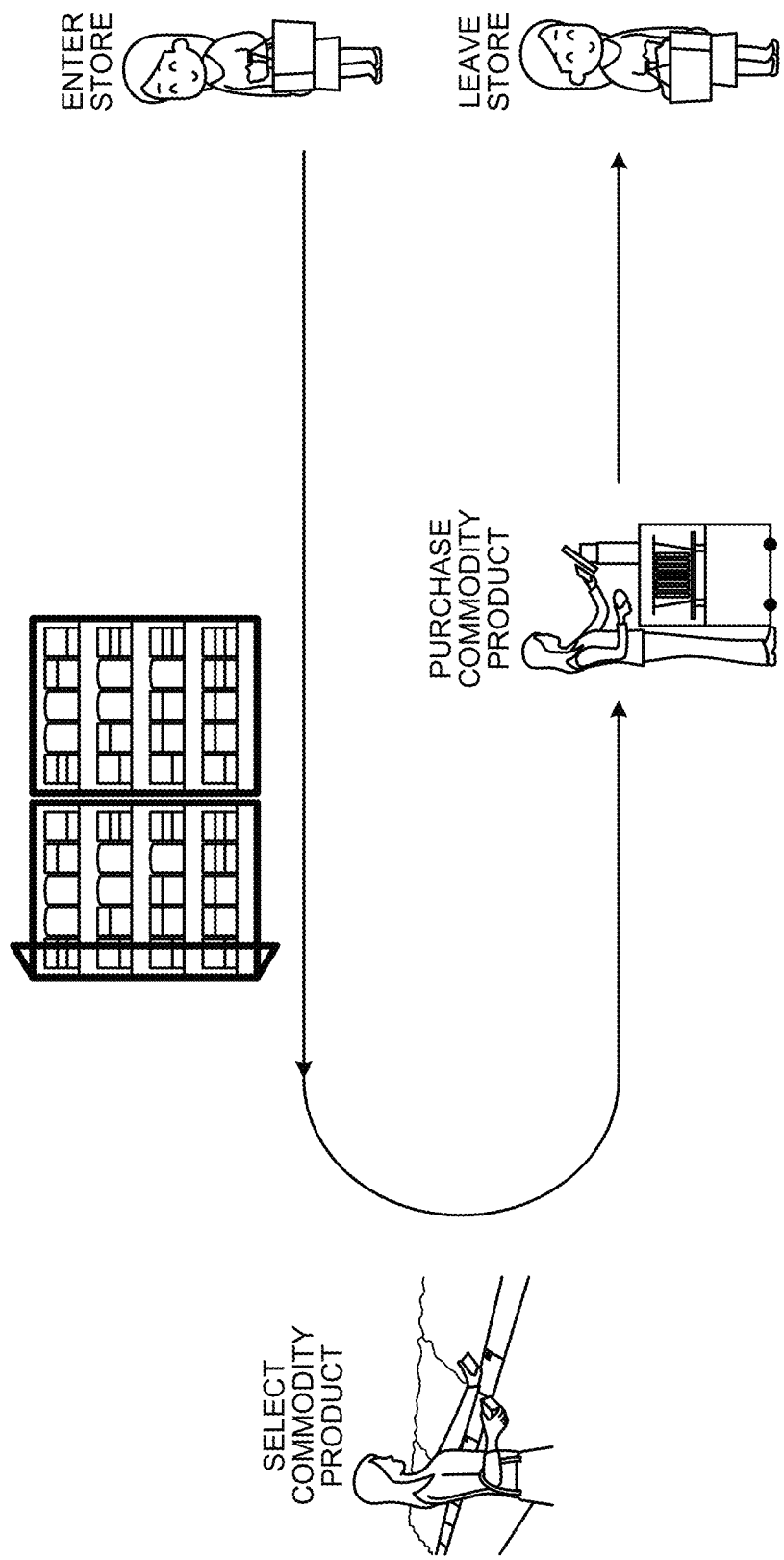
FIG. 6 is a diagram illustrating tracking of a customer.

For example, the tracking unit 22 tracks a certain person in a period of time between a point at which the person enters the store and a point at which the person leaves the store, and acquires each of the pieces of image data on the certain person captured in the store. FIG. 6 is a diagram illustrating tracking of the customer. As illustrated in FIG. 6, the tracking unit 22 performs common image analysis on the image data captured by the camera that is installed at the entrance of the store, and specifies the person who enters the store by specifying the face image of the captured person. After that, the tracking unit 22 acquires, during a period of time until the person is detected from the image data captured by the camera that is installed at the exit of the store, the pieces of image data of the subject person from the pieces of image data captured by each of the cameras that are set in the store. By doing so, the tracking unit 22 is able to acquire the pieces of image data of each of the persons captured during a period of time for which each of the persons enters the store, selects and purchases a commodity product, and leaves the store.

The skeleton detection unit 23 is a processing unit that acquires skeleton information on the person captured on the image data. Specifically, regarding each of the persons detected by the tracking unit 22, the skeleton detection unit 23 performs skeleton detection on the person with respect to the image data in which the person and the commodity product are captured from among the pieces of image data acquired by the tracking unit 22.

Figure 7:
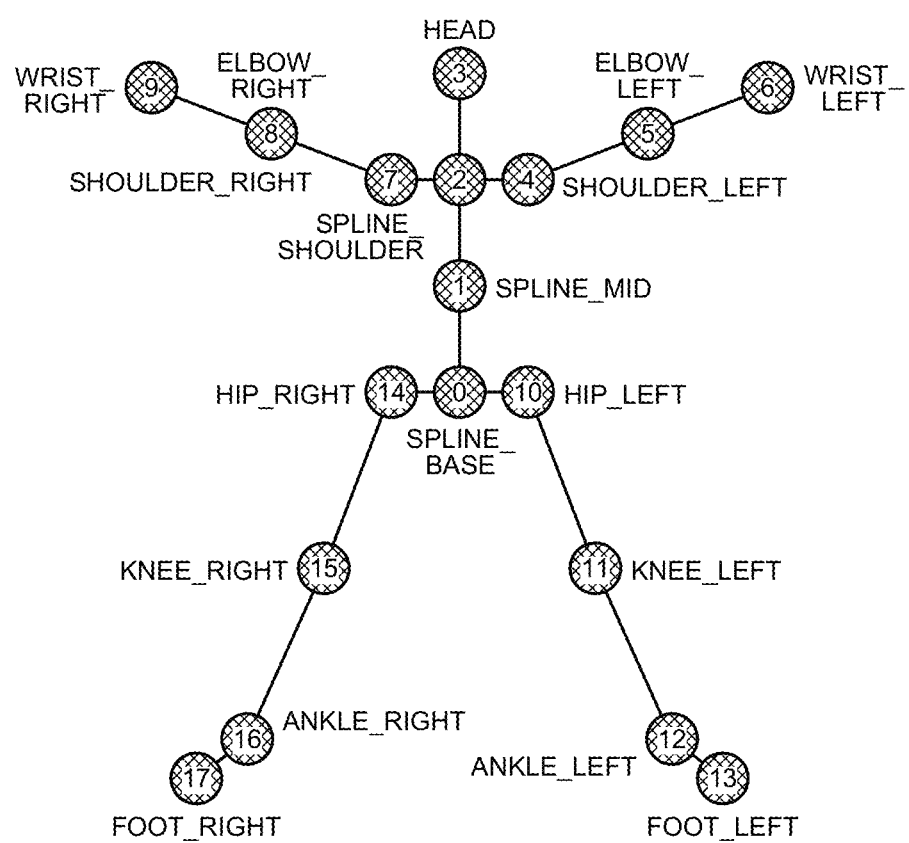
FIG. 7 is a diagram illustrating an example of skeleton information.

For example, the skeleton detection unit 23 acquires the skeleton information by inputting the image data (each frame) to a practiced machine training model. FIG. 7 is a diagram illustrating an example of the skeleton information. It is possible to use, for the skeleton information, 18 pieces of (0 to 17) of definition information obtained by numbering each joint specified by a known skeleton model. For example, number 7 is assigned to a right shoulder joint (SHOULDER_RIGHT), number 5 is assigned to a left elbow joint (ELBOW_LEFT), number 11 is assigned to a left knee joint (KNEE_LEFT), and number 14 is assigned to a right hip joint (HIP_RIGHT). Therefore, the skeleton detection unit 23 is able to acquire 18 pieces of coordinate information on the skeleton illustrated in FIG. 7 from the image data. For example, the skeleton detection unit 23 acquires "the X coordinates=X7, the Y coordinates=Y7, and the Z coordinates=Z7" as the position of the right shoulder joint denoted by number 7. Furthermore, for example, it is possible to define that the Z-axis is in a distance direction from the image capturing device to the target, the Y-axis is in a height direction perpendicular to the Z-axis, and the X-axis is in a horizontal direction.

Figure 8:
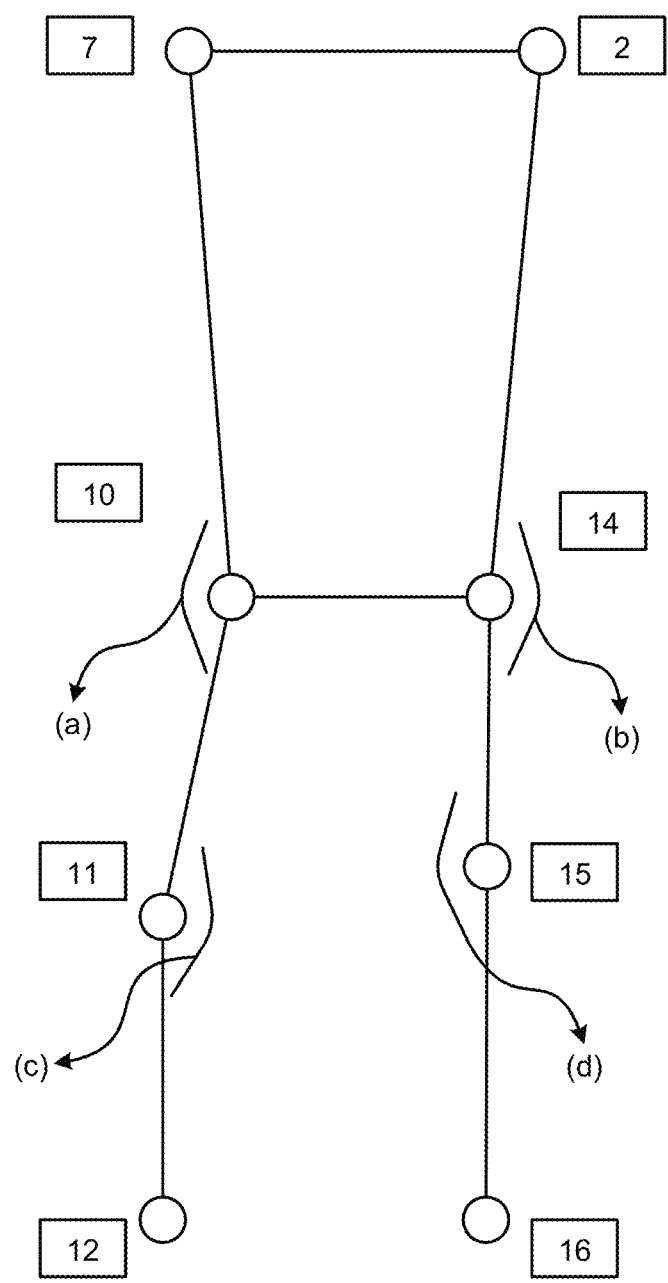
FIG. 8 is a diagram illustrating pose determination of the entire body.

Furthermore, the skeleton detection unit 23 is able to determine, by using a machine training model in which patterns of the skeletons are practiced in advance, a pose of the entire body, such as a pose of standing up, walking, squatting down, sitting down, and lying down. For example, by using a machine training model in which skeleton information or the drawing illustrated in FIG. 7 obtained by practicing an angle between one of joints and the other joints using Multilayer Perceptron, the skeleton detection unit 23 is able to determine the most similar pose of the entire body. FIG. 8 is a diagram illustrating pose determination of the entire body. As illustrated in FIG. 8, the skeleton detection unit 23 is able to detect a pose of the entire body by acquiring an angle (a) of the joints between "HIP_LEFT" denoted by number 10 and "KNEE_LEFT" denoted by number 11, an angle (b) of the joints between "HIP_RIGHT" denoted by number 14 and "KNEE_RIGHT" denoted by number 15, an angle (c) of "KNEE_LEFT" denoted by number 11, an angle (d) of "KNEE_RIGHT" denoted by number 15, or the like.

Furthermore, the skeleton detection unit 23 is able to detect a motion of each part category by performing the pose determination on the parts based on 3D joint pose of a human body. Specifically, the skeleton detection unit 23 is able to convert data from the 2D joint coordinates to the 3D joint coordinates by using a 3D-baseline technique or the like.

FIG. 9 is a diagram illustrating detection of part category motions. As illustrated in FIG. 9, regarding the part of "face", the skeleton detection unit 23 is able to detect the orientation of the face is one of the orientations (5 types) of forward, left, right, up, and down on the basis of the face orientation and on the basis of whether or not the angle formed by the face orientation and each of the direction vector is equal to or less than a threshold. Furthermore, the skeleton detection unit 23 specifies the orientation of the face on the basis of the vector that is defined by "the starting point: the midpoint of both ears, and the end point: nose". Furthermore, the skeleton detection unit 23 is able to detect whether or not the face is facing backward on the basis of the state in which "the face is facing the right and the hips are twisting right" or "the face is facing left and the hips are twisting left".

Regarding the part "arm", the skeleton detection unit 23 is able to detect that the orientation of each of the left and right arms is one of the orientations (6 types) of forward, backward, left, right, up, and down on the basis of the orientation of the forearm and on the basis of whether or not the angle formed by each of the direction vectors is equal to or less than a threshold. Furthermore, the skeleton detection unit 23 is able to detect the orientation of the arm by a vector defined by "the starting point: elbow, and the end point: wrist".

Regarding the part "leg", the skeleton detection unit 23 is able to detect that the orientation of the left and right legs is one of the orientations (6 types) of forward, backward, left, right, up, and down on the basis of the orientation of the lower leg and on the basis of whether or not the angle of each of the direction vectors is equal to or less than a threshold. Furthermore, the skeleton detection unit 23 is able to detect the orientation of the lower leg by the vector defined by "the starting point: knee, and the end point: ankle".

Regarding the part "elbow", the skeleton detection unit 23 is able to detect that the arm is extended when an elbow angle is equal to or greater than a threshold and detect that the arm is bended when the elbow angle is less than the threshold (2 types). Furthermore, the skeleton detection unit 23 is able to detect the elbow angle on the basis of the angle formed by a vector A of "the starting point: elbow, and the end point: shoulder" and a vector B of "the starting point: elbow, and the end point: wrist".

Regarding the part "knee", the skeleton detection unit 23 is able to detect that the knee is extended when a knee angle is equal to or greater than a threshold and detect that the knee is bended when the knee angle is less than the threshold (2 types). Furthermore, the skeleton detection unit 23 is able to detect the knee angle on the basis of the angle formed by a vector A of "the starting point: knee, and the end point: ankle" and a vector B of "the starting point: knee, and the end point: hip".

Regarding the part "hips", the skeleton detection unit 23 is able to detect left and right twists (2 types) on the basis of whether or not the angle of each of the hips and the shoulders is equal to or greater than a threshold, and is able to detect a forward facing state when the angle is less than the threshold. Furthermore, the skeleton detection unit 23 is able to detect the angle of each of the hips and the shoulders on the basis of the rotation angle of each of a vector A of "the starting point: left shoulder, and the end point: right shoulder" and a vector B of "the starting point: left hip (hip (L)), and the end point: right hip (hip (R))", around the axis vector C of "the starting point: the midpoint of both hips, and the end point: the midpoint of both shoulders".

A description will be given here by referring back to FIG. 2. The motion recognition unit 24 is a processing unit that recognizes a motion of a person on the basis of the detection result of the skeleton information obtained by the skeleton detection unit 23. Specifically, the motion recognition unit 24 specifies a behavior including at least one motion on the basis of a transition of skeleton information recognized for each of a plurality of consecutive frames.

For example, if a skeleton in which the face looks at the front is determined on the basis of part category determination, and a skeleton that is standing up is determined on the basis of the pose determination of the entire body are consecutively detected in several frames, the motion recognition unit 24 recognizes a motion of "looking at the front for a certain period of time". Furthermore, if a skeleton in which a variation in the pose of the entire body is less than a predetermined value is consecutively detected in several frames, the motion recognition unit 24 recognizes a motion of "unmoving".

Furthermore, if a skeleton in which an elbow angle changes by an amount equal to or greater than a threshold is detected in several frames, the motion recognition unit 24 recognizes a motion of "putting one hand forward" or a motion of "extending one arm", and, if a skeleton in which the elbow angle changes by an amount equal to or greater than the threshold and then the elbow angle becomes less than the threshold is detected in several frames, the motion recognition unit 24 recognizes a motion of "bending one hand". In addition, if a skeleton in which the elbow angle changes by an amount equal to or greater than the threshold and then the elbow angle becomes less than the threshold is detected in several frames and after that this angle further continues during several frames, the motion recognition unit 24 recognizes a motion of "looking at one hand".

Furthermore, if a skeleton in which the wrist angle consecutively changes is detected in several frames, the motion recognition unit 24 recognizes a motion of "the wrist coordinates frequently moving for a certain period of time". If a skeleton in which the wrist angle consecutively changes and the elbow angle consecutively changes is detected in several frames, the motion recognition unit 24 recognizes a motion of "the elbow coordinates and the wrist coordinates frequently moving for a certain period of time". If a skeleton in which each of the wrist angle, the elbow angle, and the orientation of the entire body consecutively changes is detected in several frames, the motion recognition unit 24 recognizes a motion of "the orientation of the body and the entire body motion frequently changing for a certain period of time".

Furthermore, regarding the commodity products included in the image data that has been subjected to skeleton detection by the skeleton detection unit 23 and that contains a captured image of a person and commodity products, the motion recognition unit 24 specify the commodity products on the basis of an image capturing region of each of the cameras and the coordinates of the commodity products that are placed within the image capturing region and refers to the commodity product DB 15, so that the motion recognition unit 24 is able to specify the size of each of the specified commodity products. As a result, the motion recognition unit 24 is able to associate each of the motions with the size of the respective commodity products.

A description will be given here by referring back to FIG. 2. The detection rule generating unit 25 is a processing unit that generates a detection rule for detecting a customer highly effective in customer service from among the visiting customers. Specifically, the detection rule generating unit 25 uses the recognition result obtained by the motion recognition unit 24 and defines combinations of basic motions related to the behaviors in three stages based on the degree of interest.

Figure 10A:
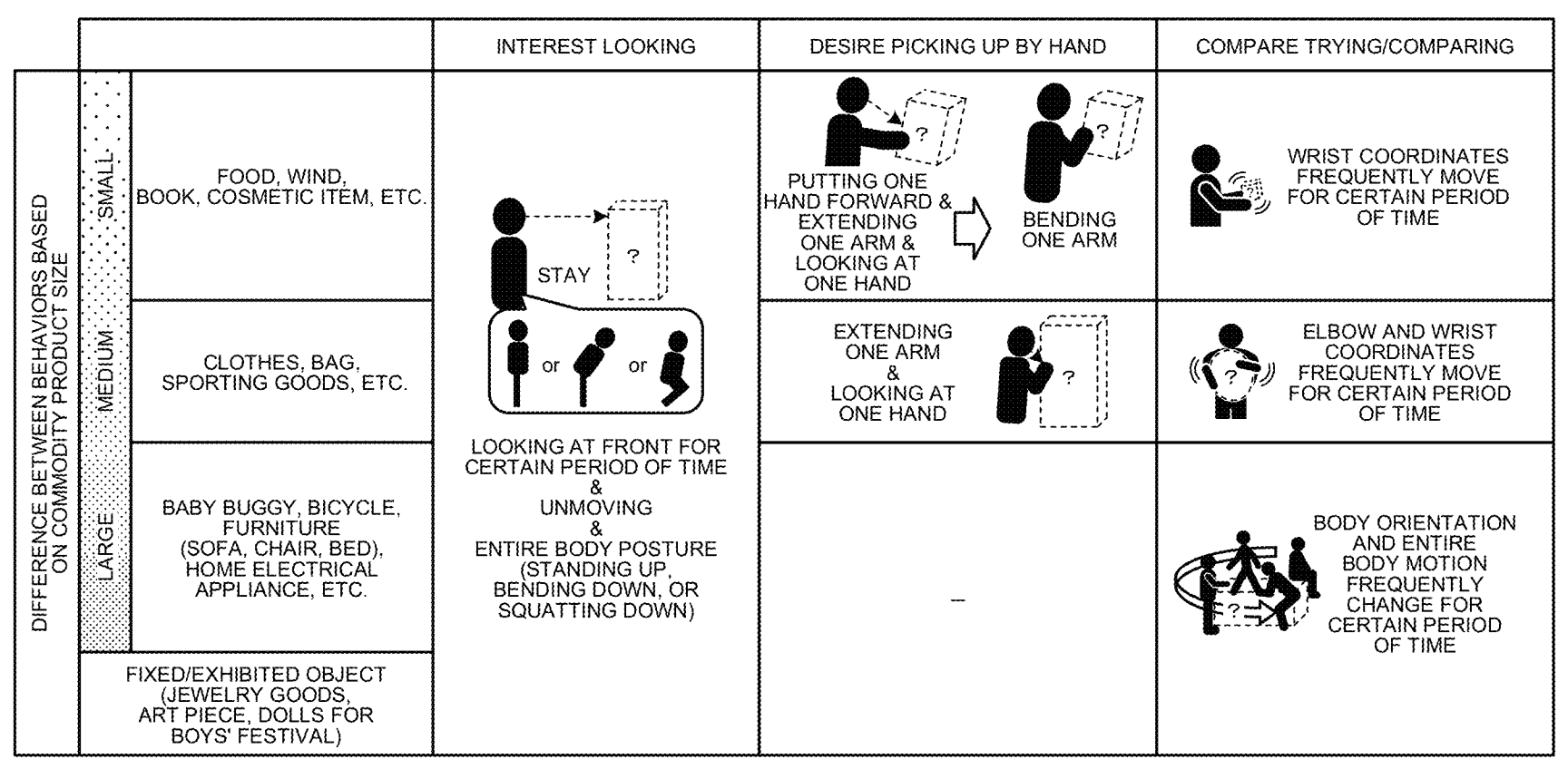

FIG. 10A is a diagram illustrating the detection rule. FIG. 10B is a diagram illustrating the detection rule indicated by using data. Furthermore, FIG. 10A conceptually illustrates the detection rule, and FIG. 10B illustrates the detection rule indicated by using data, which indicate the same information.

As illustrated in FIG. 10A, the detection rule generating unit 25 associates, as the detection rule, a behavior of a person constituted of at least one motion for each combination of each of the behaviors associated with the degree of interest (a behavior of looking, a behavior picking up by hand, and a behavior of trying/comparing) and the size of each of the commodity products that corresponds to an example of an attribute of the commodity product. Here, the behavior of "looking" corresponds to a level 1 of the degree of interest, the behavior of "picking up by hand" corresponds to a level 2 of the degree of interest, and the behavior of "trying/comparing" corresponds to a level 3 of the degree of interest.

For example, the detection rule generating unit 25 previously holds an association relationship between a behavior and a motion for specifying the behavior and accumulates the associations between each of the motions acquired from the motion recognition unit 24 and the size of each of the commodity products. For example, the same motion is made for the behavior of "looking" regardless of the size of each of the commodity products, so that the detection rule generating unit 25 associates the commodity product in each of the sizes with, as the behavior of "looking", each of the motion of "looking at the front for a certain period of time", a motion of "unmoving", a motion of "standing up", a motion of "bending down", and a motion of "squatting down".

Furthermore, regarding the behavior of "picking up by hand", the motion thereof is different depending on the sizes of the commodity products, so that the detection rule generating unit 25 defines the behavior for each of the sizes of the commodity products. For example, regarding a small size commodity product, such as a food item, or a medium size commodity product, such as a bag, the detection rule generating unit 25 associates a series of motions starting from one of the motion of "putting one hand forward", the motion of "extending one arm", and the motion of "looking at one hand" to the motion of "bending one arm". In contrast, regarding a large size commodity product, such as furniture, the detection rule generating unit 25 associates the motion of "bending one arm" with the motion of "looking at one hand".

Similarly, regarding the behavior of "trying/comparing", the motion thereof is different depending on the commodity product size, so that the detection rule generating unit 25 defines each of the sizes of the commodity products. For example, the detection rule generating unit 25 associates a small size commodity product, such as a food item, with the motion of "the wrist coordinates frequently moving for a certain period of time". The detection rule generating unit 25 associates a medium size commodity product with the motion of "the elbow coordinates and the wrist coordinates frequently moving for a certain period of time". The detection rule generating unit 25 associates a large size commodity product, such as furniture, with the motion of "the orientation of the body and the entire body motion frequently change for certain period of time".

Furthermore, the detection rule generating unit 25 is able to associate the motion with a fixed and exhibited object, such as jewelry goods, art pieces, or dolls for the Boys' Festival, by performing the same process described above.

The information indicated by using data obtained from the association result is illustrated in FIG. 10B. As illustrated in FIG. 10B, if one of the motion of "looking at the front for a certain period of time", the motion of "unmoving", the motion of "standing up", the motion of "bending down", and the motion of "squatting down" is detected, this indicates that the combination of the behavior of "looking" having the degree of interest of the level 1 and the commodity product sizes of "large, medium, and small" is specified.

Furthermore, if the series of motions starting from one of the motion of "putting one hand forward", the motion of "extending one arm", and the motion of "looking at one hand" to the motion of "bending one arm" is detected, this indicates that the combination of the behavior of "picking up by hand" having the degree of interest of the level 2 and the commodity product size of "small" is specified. Similarly, if the motion of "bending one arm" or the motion of "looking at one hand" is detected, this indicates that the combination of the behavior of "picking up by hand" having the degree of interest of the level 2 and the commodity product size "medium" is specified. Furthermore, in the "motion ID", an identifier for identifying the motion that specifies the detection rule is set.

Figure 11:
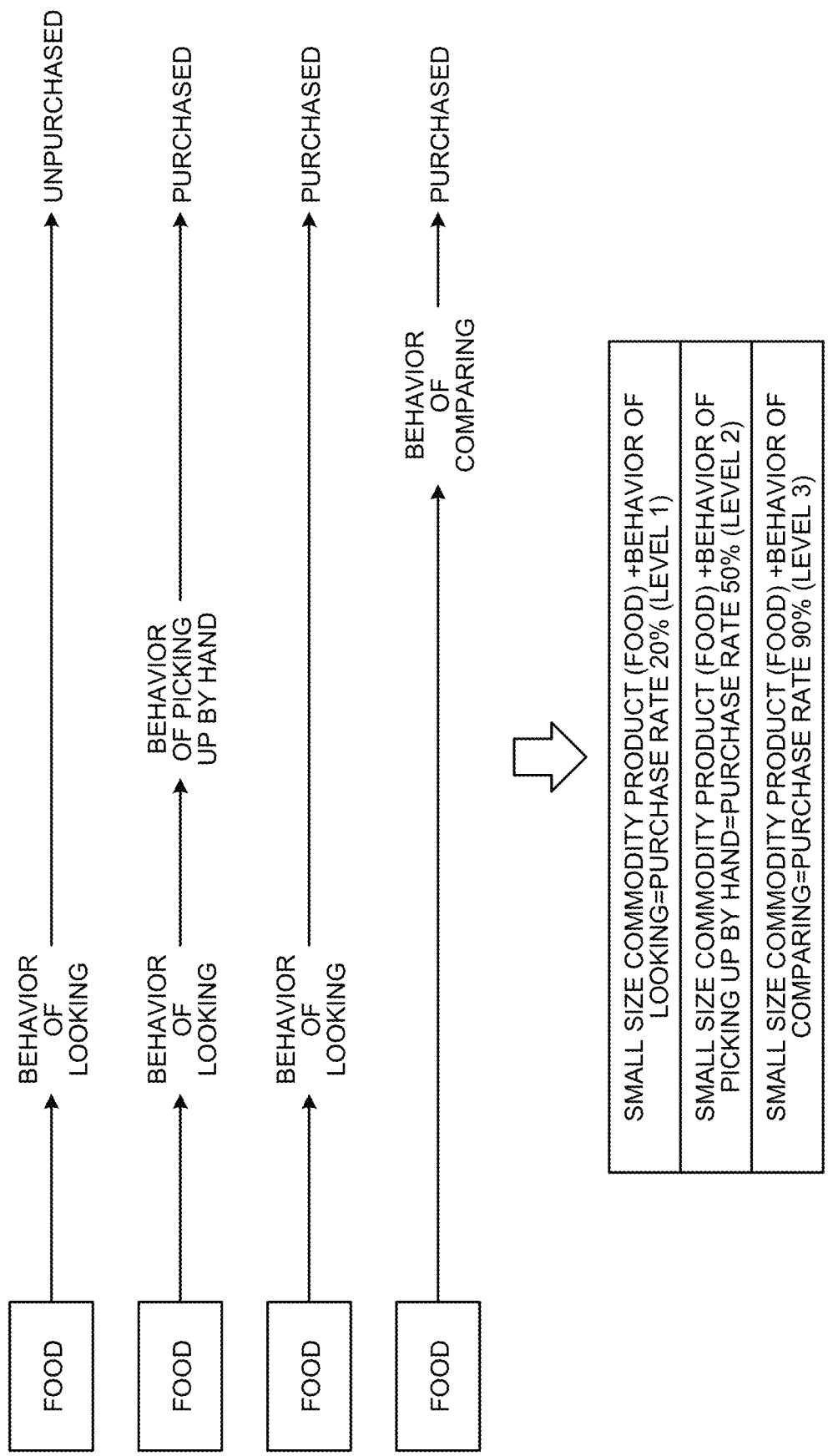
FIG. 11 is a diagram illustrating an example of deciding the degree of interest.

Furthermore, associating the degree of interest with the behavior may be decided by the past history or an experimental rule, but may also be decided by the frequency in the actual purchase of commodity products. FIG. 11 is a diagram illustrating a decision example of the degree of interest. As illustrated in FIG. 11, the detection rule generating unit 25 generates data indicating that "the person exhibited the behavior of "looking" at a food item did not purchase the food item", and generates data indicating that "the person exhibited the behavior of "looking" at a food item and then exhibited the behavior of "picking up by hand" purchased the food item". Furthermore, the detection rule generating unit 25 generates data indicating that "the person exhibited the behavior of "looking" at the food item consequently purchased the food item", and generates data indicating that "the person exhibited the behavior of "looking" at a food item and then exhibited the behavior of "comparing" consequently purchased the food item".

These pieces of data are accumulated, and if the rate of the persons exhibited the behavior of "looking" with respect to the commodity product of the "food item" to the persons purchased the commodity product is less than a first threshold (for example, 30%), the detection rule generating unit 25 decides that the degree of interest of the person in the commodity product exhibited the behavior of "looking" with respect to the commodity product of the "food item" is the "level 1".

Furthermore, if the rate of the persons exhibited the behavior of "picking up by hand" with respect to the commodity product of the "food item" to the persons purchased the commodity product is equal to or greater than the first threshold (for example, 20%) and less than a second threshold (for example, 70%), the detection rule generating unit 25 decides that the degree of interest of the person in the commodity product exhibited the behavior of "picking up by hand" with respect to the commodity product of the "food item" is the "level 2".

Furthermore, if the rate of the persons exhibited the behavior of "comparing" with respect to the commodity products of the "food item" to the persons purchased the commodity product is equal to or greater than the second threshold (for example, 70%), the detection rule generating unit 25 decides that the degree of interest of the person in the commodity product exhibited the behavior of "comparing" with respect to the commodity products of the "food item" is the "level 3". In addition, here, a case has been described by using, as an example, the food item (small size) that is a small size commodity product; however, it is possible to perform the same process described above on the commodity product in each size.

Flow of Process

Figure 12:
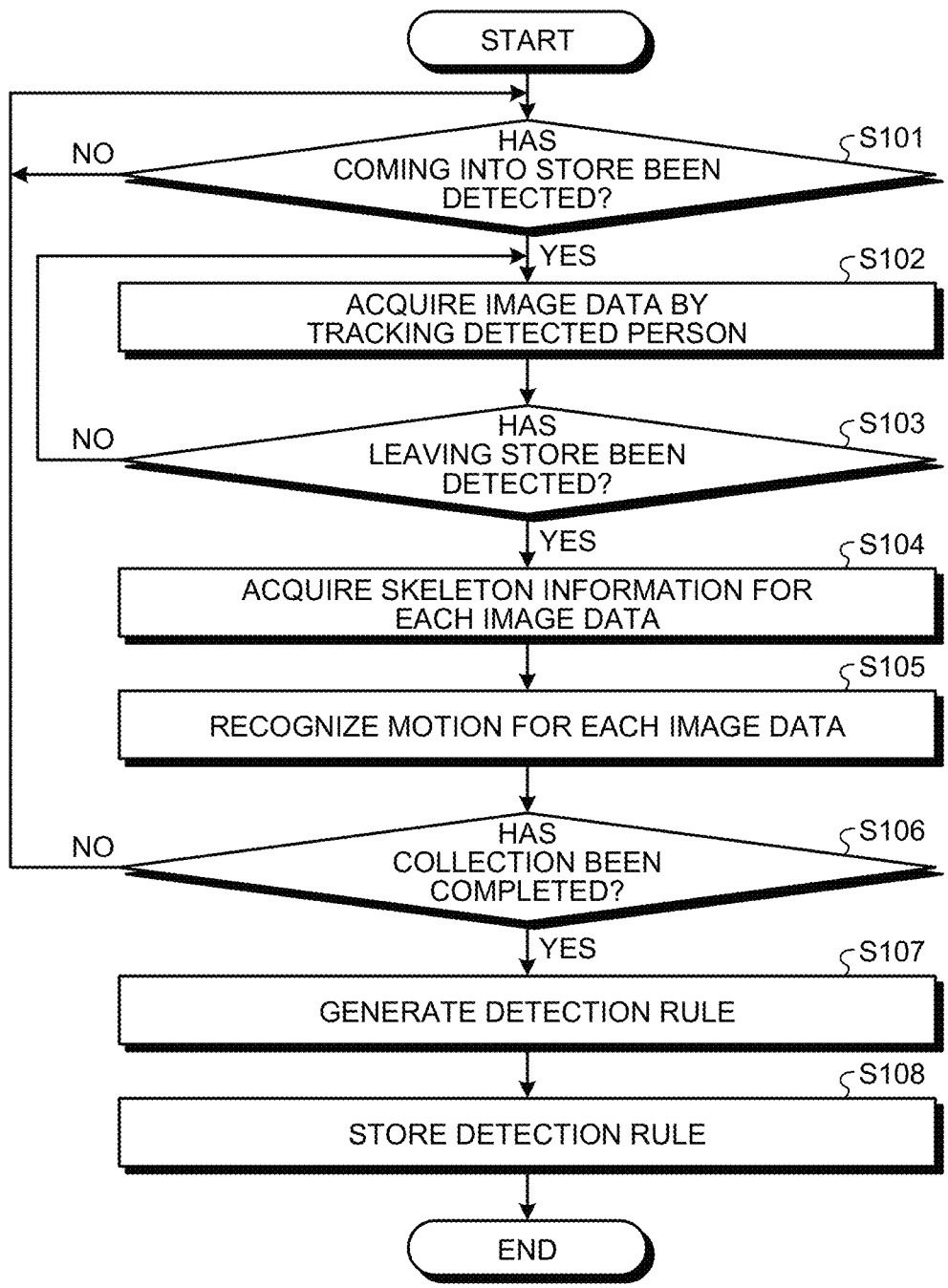
FIG. 12 is a flowchart illustrating the flow of a detection rule generating process.

FIG. 12 is a flowchart illustrating the flow of the detection rule generating process. As illustrated in FIG. 12, if the information processing apparatus 10 detects, on the basis of the image data, that a person enters the store (Yes at Step S101), the information processing apparatus 10 tracks the detected person and acquires the image data (Step S102). Then, the information processing apparatus 10 repeats the process until the person leaves the store (No at Step S103), repeats the process at Step S102 and the subsequent processes, and acquires the image data by tracking the detected person.

After that, if the information processing apparatus 10 detects that the person targeted for the tracking leaves the store (Yes at Step S103), the information processing apparatus 10 acquires the skeleton information for each captured image data (Step S104), and recognizes a motion for each image data (Step S105). At this time, the information processing apparatus 10 is able to perform the process of acquiring the skeleton information and performing motion recognition by narrowing down to the image data that includes both of the person and commodity products.

Here, if the information processing apparatus 10 continues a process of collecting data (No at Step S106), the information processing apparatus 10 repeats the process at Step S101 and the subsequent processes. In contrast, if the information processing apparatus 10 ends the process of collecting data (Yes at Step S106), the information processing apparatus 10 generates the detection rule in which a motion is associated with each of the combinations of the behaviors and the sizes of the respective commodity products (Step S107). Then, the information processing apparatus 10 stores the detection rule in the storage unit 12 or outputs the detection rule (Step S108).

Variation

In the example described above, a case has been described as an example in which the information processing apparatus 10 calculates the purchase rate of the user who has been subjected to behavior recognition and purchased the commodity product, and then, decides the degree of interest; however, the example is not limited to this. For example, the information processing apparatus 10 is able to make a decision on the basis of the number of times a person has touched the commodity product, the period of time for which the user stays in front of the commodity product, or the like.

For example, the information processing apparatus 10 is able to decide the level 1 in the case where the number of touches made on a commodity product is less than the first threshold, decide the level 2 in the case where the number of touches made on a commodity product is equal to or greater than the first threshold and is less than the second threshold, and decide the level 3 in the case where the number of touches made on a commodity product is equal to or greater than the second threshold such that the degree of interest is increased as the number of touches made on the commodity product is increased. Similarly, the information processing apparatus 10 may calculate, as the staying time, the period of time for which the same person is consecutively detected in a plurality of pieces of consecutive image data (frame), and increase the degree of interest as the staying time of the person in front of the commodity product is increased.

Furthermore, the information processing apparatus 10 is able to generate the detection rule for each type of the commodity products, such as a food item, large size furniture, a bicycle, a toy, regardless of the detection rule for each size of the commodity products. Furthermore, the information processing apparatus 10 is able to feed back, by using the detection rule, the result of the actually provided customer service to the detection rule. For example, as the result of providing a customer service using the detection rule at a certain level, the information processing apparatus 10 may increase the level by one in the case where the number or the rate of the persons actually purchased the commodity product exceeds a threshold, and, in contrast, the information processing apparatus 10 may decrease the level by one in the case where the number or the rate of the persons actually purchased the commodity product falls below the threshold.

Effects

As described above, the information processing apparatus 10 is able to generate the detection rule in which the behavior of the customer is associated with the feature amount that specifies a commodity product, such as the size or the type of the commodity product. As a result, the information processing apparatus 10 is able to detect a customer highly effective in customer service without generating a detailed rule for each commodity product. Furthermore, the information processing apparatus 10 is able to appropriately change the feature amount or the level in accordance with the store in which the information processing apparatus 10 is installed, so that it is possible to generate a detection rule in accordance with the store and detect a customer highly effective in customer service matched with the location or the situation of the store.

[b] Second Embodiment

Overall Configuration

Figure 13:
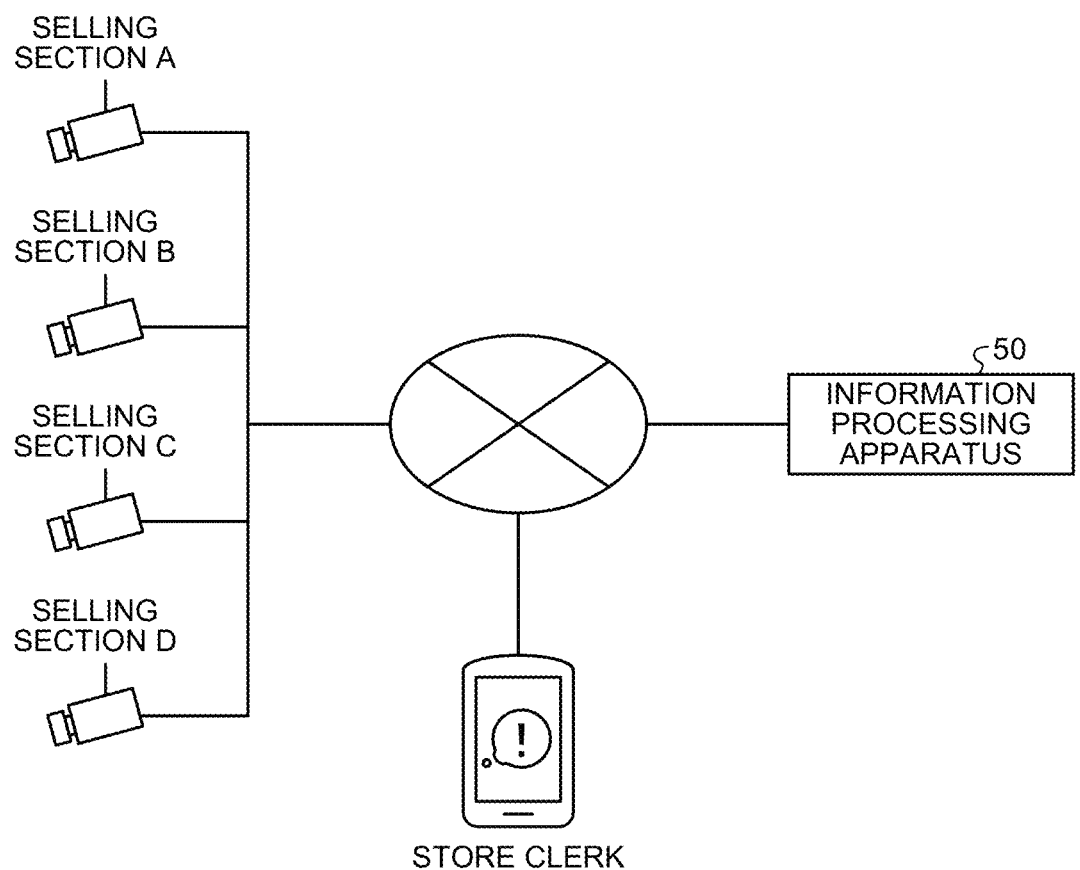
FIG. 13 is a diagram illustrating an example of the overall configuration of a customer service detection system according to a second embodiment.

In the following, an example of detecting a customer highly effective in customer service from among customers visiting the store will be described. FIG. 13 is a diagram illustrating an example of the overall configuration of a customer service detection system according to a second embodiment. As illustrated in FIG. 13, in this system, each of cameras installed in the selling section A, the selling section B, the selling section C, and the selling section D, a terminal that is used by a store clerk, and an information processing apparatus 50 are connected with each other via a network, such as the Internet, regardless of a wired or wireless connection.

Each of the cameras installed in the respective selling sections is installed at a position in which images of commodity products placed in the respective selling sections are able to be captured, captures image data, moving image data, video image data, or the like, and periodically transmits the data to the information processing apparatus 50. Furthermore, a commodity product ID that specifies a commodity product and the coordinates that specify a position of the commodity product are allocated to each of the commodity products that are placed in a region captured by the respective cameras, and control is performed such that a type and a position of each of the commodity product are able to be specified.

The terminal that is used by the store clerk corresponds to an example of a mobile terminal, such as a smartphone or a mobile phone, displays a message received from the information processing apparatus 50, and transmits the result of an operation performed by the store clerk to the information processing apparatus 50.

The information processing apparatus 50 is an example of a computer that analyzes the image data received from the camera installed in each of the selling sections and that detects a customer highly effective in customer service. Specifically, the information processing apparatus 50 detects a person and a commodity product from the image data and acquires the skeleton information on the detected person. The information processing apparatus 50 specifies the behavior of the person exhibiting with respect to the commodity product on the basis of the skeleton information on the person. The information processing apparatus 50 specifies, on the basis of the behavior of the person exhibiting with respect to the specified commodity product, a combination of the attribute of the commodity product and the degree of interest in the commodity product.

For example, the information processing apparatus 50 recognizes the behavior of the customer by analyzing the image data received from the camera installed in each of the selling sections, and notifies the terminal used by the store clerk of information in the case where a customer exhibiting the behavior that matches the detection rule generated in the first embodiment is detected.

Figure 14:
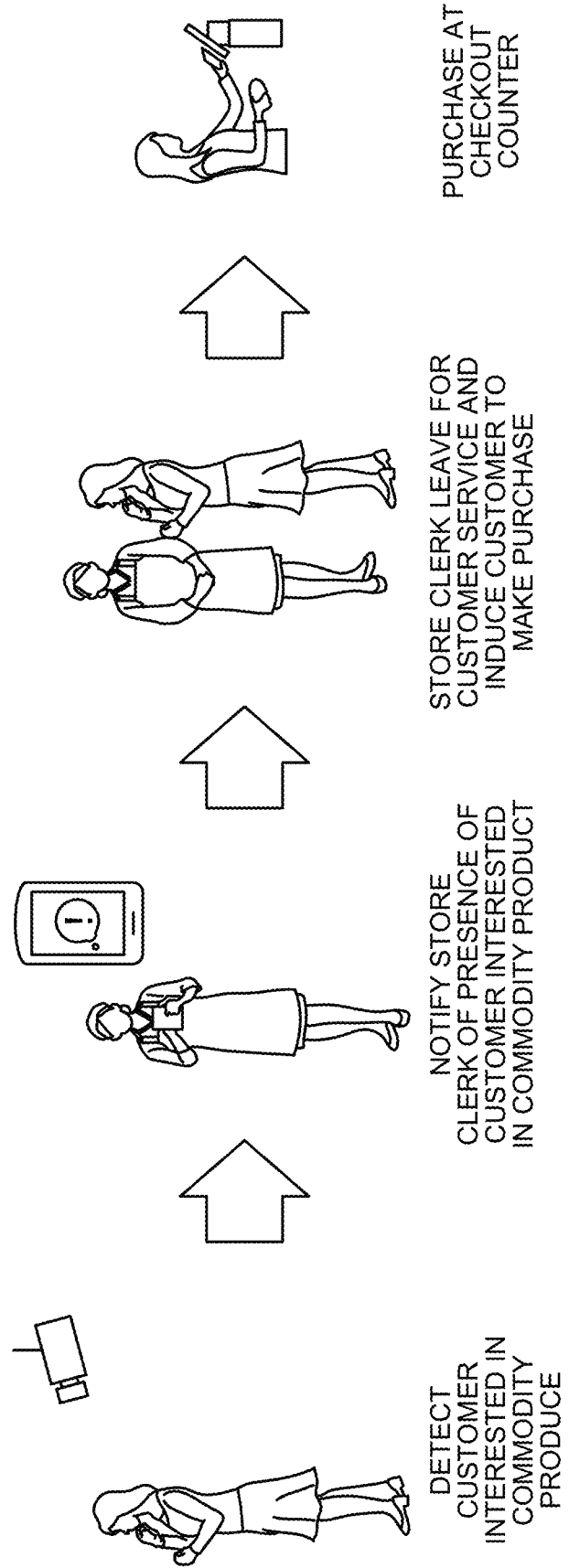
FIG. 14 is a diagram illustrating the flow of the customer service detection system according to the second embodiment.

FIG. 14 is a diagram illustrating the flow of the customer service detection system according to the second embodiment. As illustrated in FIG. 14, if the information processing apparatus 50 detects, on the basis of the detection rule, a customer who is interested in a commodity product in the certain selling section A, the information processing apparatus 50 notifies the terminal used by the store clerk of the presence of the customer who is interested in the commodity product. At this time, the information processing apparatus 50 may simultaneously send information on the detected selling section A.

As a result, the store clerk is able to leave for a customer service and induce the customer to make a purchase, whereas the customer is able to purchase the commodity product at a checkout counter after resolving a question or a concern related to the commodity product. As a result, it is possible to provide a customer service with high merits for both of the store and the customer.

Functional Configuration

Figure 15:
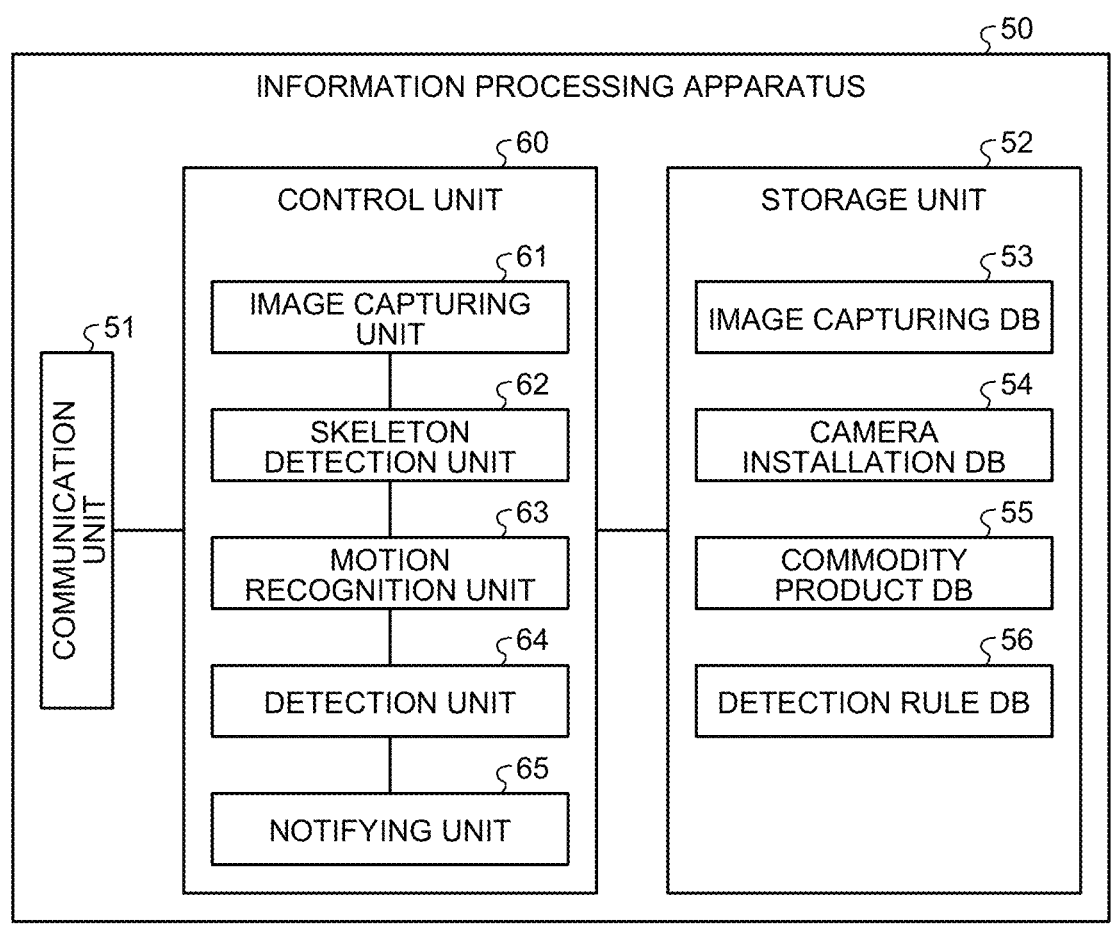
FIG. 15 is a functional block diagram illustrating a functional configuration of an information processing apparatus according to the second embodiment.

FIG. 15 is a functional block diagram illustrating a functional configuration of the information processing apparatus 50 according to the second embodiment. As illustrated in FIG. 15, the information processing apparatus 50 includes a communication unit 51, a storage unit 52, and a control unit 60.

The communication unit 51 is a processing unit that controls communication with another device and is implemented by, for example, a communication interface or the like. For example, the communication unit 51 receives moving image data (for example, image data) from each of the cameras and transmits a message or the image data to the terminal used by the store clerk.

The storage unit 52 is an example of a storage device that stores therein various kinds of data or a program or the like executed by the control unit 60 and is implemented by, for example, a memory, a hard disk, or the like. The storage unit 52 stores therein an image capturing DB 53, a camera installation DB 54, a commodity product DB 55, and a detection rule DB 56.

The image capturing DB 53, the camera installation DB 54, the commodity product DB 55, and the detection rule DB 56 store therein the same information as that stored in the image capturing DB 13, the camera installation DB 14, the commodity product DB 15, the detection rule DB 17, respectively, described above in the first embodiment, so that detailed descriptions thereof will be omitted.

The control unit 60 is a processing unit that manages the entire of the information processing apparatus 50 and is implemented by, for example, a processor or the like. The control unit 60 includes an image capturing unit 61, a skeleton detection unit 62, a motion recognition unit 63, a detection unit 64, and a notifying unit 65.

The image capturing unit 61 is a processing unit that captures an image. For example, similarly to the image capturing unit 21 described above in the first embodiment, the image capturing unit 61 receives image data captured by each of the cameras and stores the received image data in the image capturing DB 53.

The skeleton detection unit 62 is a processing unit that acquires the skeleton information on the person included in the captured image data. For example, the skeleton detection unit 62 uses the techniques illustrated in FIG. 7 to FIG. 9 described above in the first embodiment, performs the processes of skeleton detection, entire body pose determination, and detection of a part category motion, and outputs the result of the processes to the motion recognition unit 63.

The motion recognition unit 63 is a processing unit that performs behavior recognition on a person by using the skeleton detection, the entire body pose determination, and the detection of the part category motion that have been detected by the skeleton detection unit 23. Specifically, the motion recognition unit 63 uses the technique described above in the first embodiment, recognizes each of the motions for specifying the behaviors, and outputs the recognized motions to the detection unit 64.

For example, the motion recognition unit 63 recognizes, on the basis of the skeleton detection performed by the skeleton detection unit 62, each of the motions of the motion of "looking at the front for a certain period of time", the motion of "unmoving", the motion of "standing up", the motion of "bending down", and the motion of "squatting down". Furthermore, the motion recognition unit 63 recognizes, on the basis of the skeleton detection performed by the skeleton detection unit 62, each of the motions of the motion of "putting one hand forward", the motion of "extending one arm", the motion of "looking at one hand", and the motion of "bending one arm" motion. Similarly, the motion recognition unit 63 recognizes the motion of "bending one arm" and the motion of "looking at one hand". Furthermore, the motion recognition unit 63 recognizes the motion of "the wrist coordinates frequently moving for a certain period of time", the motion of "the elbow coordinates and the wrist coordinates frequently moving for a certain period of time", or the motion of "the orientation of the body or the motion of the entire body frequently changes for a certain period of time".

Furthermore, the motion recognition unit 63 is able to detect not only a single motion but also a plurality of consecutive motions by using each of the pieces of skeleton information that are detected by using a plurality of pieces of image data. For example, if the motion recognition unit 63 recognizes, from among 10 frames, the motion of "putting one hand forward" at the top frame, continuously recognizes the motion of "putting one hand forward" up to the fifth frame, and then recognizes the motion of "bending one arm" at the sixth frame, the motion recognition unit 63 is able to recognize a series of behaviors of the motion of "putting one hand forward" toward the motion of "bending one arm".

The detection unit 64 is a processing unit that specifies, on the basis of the behavior of the person exhibiting with respect to the specified commodity product, a combination of the attribute of the commodity product and the degree of interest in the commodity product. In other words, the detection unit 64 performs detection of the person who exhibits a behavior that matches the detection rule, who is a customer highly effective in customer service, and who is interested in the commodity product. Then, the detection unit 64 outputs, to the notifying unit 65, the detected selling section, the time, and the information on the person.
Detection Example 1

Figure 16B:
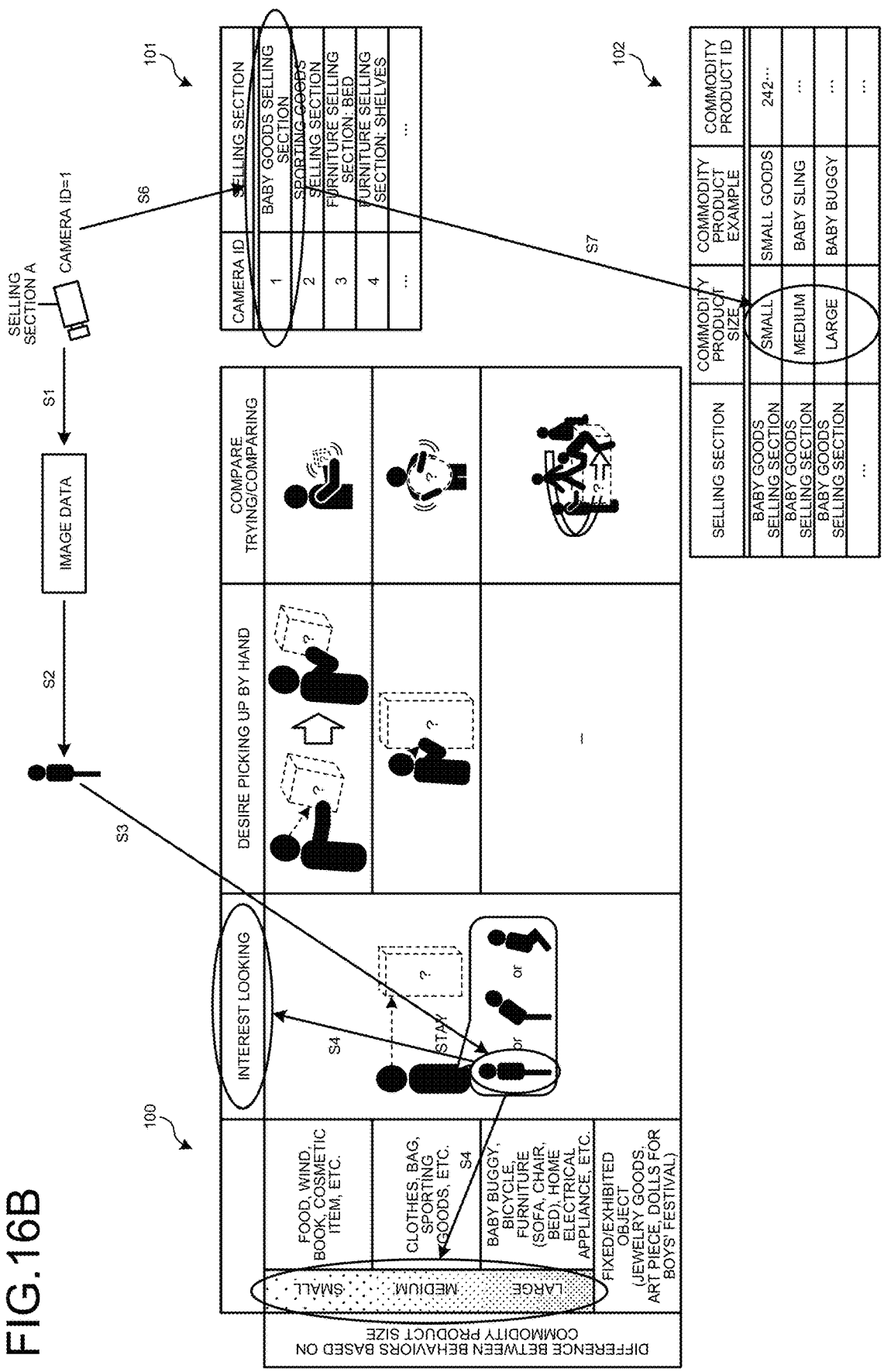
FIG. 16B is a diagram illustrating the detection example 1 according to the second embodiment.
Figure 16C:
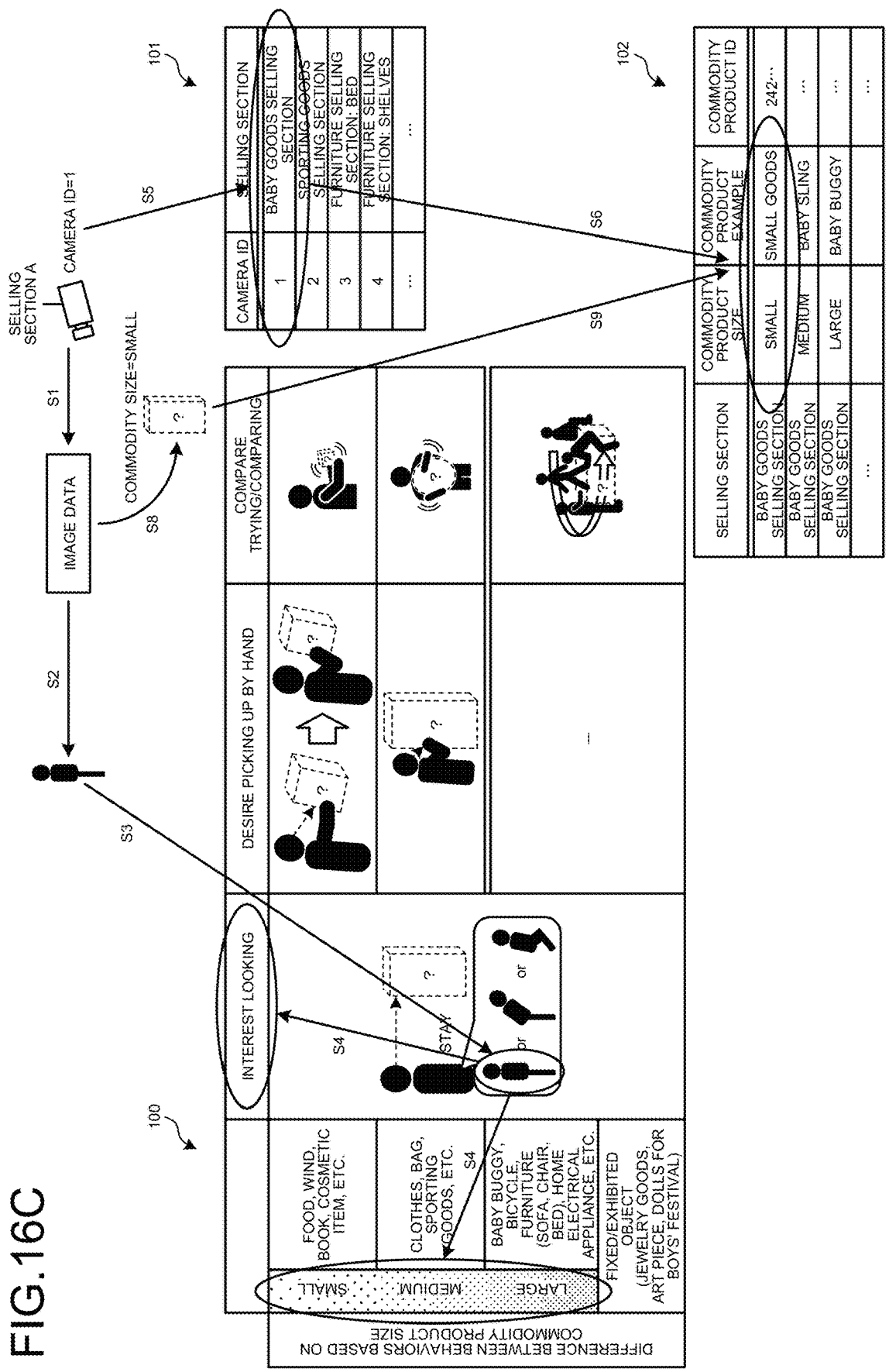
FIG. 16C is a diagram illustrating the detection example 1 according to the second embodiment.

FIG. 16A, FIG. 16B, and FIG. 16C are diagrams each illustrating the detection example 1 according to the second embodiment. As illustrated in FIG. 16A, the image capturing unit 61 acquires the image data captured in the selling section A (S1), and the motion recognition unit 63 detects the motion of "looking at the front for a certain period of time" on the basis of the result of the skeleton detection of the image data performed by the skeleton detection unit 62 (S2). Then, the detection unit 64 refers to the detection rule DB 56 (S3), and specifies, as a combination of the attribute of the commodity product and the degree of interest associated with the motion of "looking at the front for a certain period of time", "the attribute of the commodity product=small size, medium size, or large size, and the degree of interest=looking (Interest)" (S4). In other words, the detection unit 64 specifies the degree of interest (the level 1). Then, "the attribute of the commodity product=small size, medium size, or large size, and the degree of interest=looking (Interest)", which is the combination of the attribute of the commodity product and the degree of interest, is transmitted to the terminal for the store clerk by the notifying unit 65 (S5).

At this time, as illustrated in FIG. 16B, if the motion of "looking at the front for a certain period of time" has been detected from the image data captured by the camera with the camera ID=1, the detection unit 64 is able to refer to the camera installation DB 54 and specify that the location of the captured image is the baby goods selling section (S6). Then, the detection unit 64 refers to the commodity product DB 55 and specifies a small item, a baby sling, and a baby buggy as the commodity products corresponding to the commodity product size=small, medium, and large, respectively (S7). As a result, the detection unit 64 specifies "the attribute of the commodity product=the small item, the baby sling, and the baby buggy, and the degree of interest=looking (Interest)" as the combination of the attribute of the commodity product and the degree of interest.

Furthermore, as illustrated in FIG. 16C, if the detection unit 64 specifies that, regarding the commodity product included in the captured image data, the commodity product size is "small" on the basis of the previously defined coordinate position or the image analysis (S8), the detection unit 64 is also able to refer to the commodity product DB 55 and specify the small item as the commodity product corresponding to the commodity product size=small (S9). As a result, the detection unit 64 specifies "the attribute of the commodity product=small item, and the degree of interest=looking (Interest)" as the combination of the attribute of the commodity product and the degree of interest.

Here, an example of the detection rule DB 56 will be described with reference to FIG. 16A. The detection rule DB 56 includes information 100 in which the type of motion made by a person with respect to a commodity product is defined for each combination of an attribute of a commodity product and the degree of interest in the commodity product.

The attribute of the commodity product includes a category that indicates one of the sizes of "large", "medium", "small", and "others" of the commodity products. The commodity products with the size of "large" include the commodity products, such as "baby buggies, bicycles, furniture (sofas, chairs, or beds), home electrical appliances, etc.". The commodity products with the size of "medium" include the commodity products, such as "clothes, bags, sporting goods, etc.". The commodity products with the size of "small" include the commodity products, such as "food items, wine, books, cosmetic items, etc.". Furthermore, the commodity product with the size of "others" include "fixed/exhibited object (jewelry goods, art pieces, or dolls for the Boys' Festival)".

The degree of interest in the commodity product includes categories of a plurality of levels indicating an interest in the commodity product. The degree of interest associated with "looking (Interest)" indicates the state of "low" corresponding to the level 1. The degree of interest associated with "pick up (Desire)" indicates the state of "medium" corresponding to the level 2. The degree of interest associated with "trying/comparing (Compare)" indicates the state of "large" corresponding to the level 3.

For example, if the type of motion of the person performed with respect to the commodity product is the motion of "looking at the front for a certain period of time", the motion of "looking at the front for a certain period of time" is associated with each of the sizes of the commodity products of "large", "medium", "small", and "others". Furthermore, the motion of "looking at the front for a certain period of time" is associated with the degree of interest of "looking (Interest)".

In the following, an example of the camera installation DB 54 will be described with reference to FIG. 16B. The camera installation DB 54 includes information 101 in which the camera ID is associated with the selling section. The camera ID indicates the identification information on the camera. The selling section indicates the location of the image captured by the camera. For example, the camera ID of "1" is associated with the selling section of "the baby goods selling section".

In the following, an example of the commodity product DB 55 will be described with reference to FIG. 16C. The commodity product DB 55 includes information 102 in which a selling section, a commodity product size, a commodity product example, and a commodity product ID are associated with each other. The selling section indicates a selling section of a commodity product. The commodity product size indicates an attribute of the commodity product. The commodity product example indicates a name of the commodity product. The commodity product ID indicates the identification information of a commodity product. For example, the selling section of "baby goods selling section", the commodity product size of "small", the commodity product example of "small item", and the commodity product ID of "242 . . . " are associated with each other.

The detection example 1 according to the second embodiment will be described by referring back to FIG. 16A, FIG. 16B, and FIG. 16C. Here, an example in which the detection unit 64 specifies a commodity product by using the camera installation DB 54, the commodity product DB 55, and the detection rule DB 56 without specifying the commodity product size on the basis of an image analysis will be described. In other words, in the detection example 1 according to the second embodiment, the detection unit 64 specifies the commodity product included in the captured image data by using the size of the commodity product that has been specified by referring to the detection rule DB 56.

Specifically, the detection unit 64 refers to the detection rule DB 56 and specifies the "type of a motion of a person performing on a commodity product" that is associated with the "motion based on a result of skeleton detection". Then, the detection unit 64 specifies a "combination of an attribute of the commodity product and the degree of interest" that is associated with the "type of the motion of the person performing on the commodity product".

Here, it is assumed that the detection unit 64 specifies, as the combination of the attribute of the commodity product and the degree of interest, "the attribute of the commodity product=small size, and the degree of interest=looking (Interest)". At this time, the detection unit 64 refers to the camera installation DB 54 and specify a "selling section" by using the camera ID that captures the person who performed the detected motion. For example, the detection unit 64 specifies the "baby goods selling section". Then, the detection unit 64 refers to the commodity product DB 55 and specifies the "commodity product size and the commodity product example" that are associated with the specified "selling section". For example, the detection unit 64 specifies the "commodity product size and the commodity product example" associated with the "baby goods selling section".

Then, the detection unit 64 refers to the commodity product DB 55 and specifies a small item as the commodity product corresponding to the "small size". Furthermore, the detection unit 64 specifies "looking (Interest)" as the degree of interest in the small item.

As a result, the detection unit 64 is able to specify the name of the commodity product looked by the person who has performed the detected motion, the degree of interest in the commodity product, and the selling section of the commodity product. The notifying unit 65 transmits, to the store clerk terminal carried by the store clerk in charge of customer service, a message indicating the presence of a customer highly effective in customer service together with at least one of the name of the commodity product, the degree of interest in the commodity product, and the selling section of the commodity product.

Detection Example 2

FIG. 17 is the detection example 2 according to the second embodiment. As illustrated in FIG. 17, if a series of behaviors of the motion of "putting one hand forward" and the motion of "bending one arm" is detected, the detection unit 64 specifies the "commodity product size=small and medium, and the degree of interest=picking up by hand (Desire)" as a combination of the attribute of the commodity product and the degree of interest. In other words, the detection unit 64 specifies the degree of interest (the level 2).

At this time, if the above described motion (behavior) is detected from the image data captured by the camera with the camera ID=2, the detection unit 64 is able to specify that the captured location is the baby goods selling section by referring to the camera installation DB 14. Then, the detection unit 64 refers to the commodity product DB 15 and specifies a ball and a baseball glove as the commodity products corresponding to the commodity product size=small and medium. As a result, the detection unit 64 specifies "the attribute of the commodity product=ball and baseball glove, and the degree of interest=picking up by hand (Desire)" as the combination of the attribute of the commodity product and the degree of interest.

Furthermore, if the detection unit 64 specifies that, regarding the commodity product included in the captured image data, the commodity product size is a "medium" on the basis of the previously defined coordinate position or the image analysis, the detection unit 64 is also able to refer to the commodity product DB 15 and specify the baseball glove as the commodity product corresponding to the commodity product size=medium. As a result, the detection unit 64 specifies "the attribute of the commodity product=baseball glove, and the degree of interest=picking up by hand (Desire)" as the combination of the attribute of the commodity product and the degree of interest.

Furthermore, if the motion of "bending one arm" or the motion of "looking at one hand" is detected, the detection unit 64 specifies "the commodity product size=large, and the degree of interest=picking up by hand (Desire)" as a combination of the attribute of the commodity product and the degree of interest.

Detection Example 3

FIG. 18 is a diagram illustrating the detection example 3 according to the second embodiment. As illustrated in FIG. 18, if the motion of "the orientation of the body or the motion of the entire body frequently changes for a certain period of time" is detected, the detection unit 64 specifies "the commodity product size=large, and the degree of interest=trying/comparing (Compare)" as a combination of the attribute of the commodity product and the degree of interest. In other words, the detection unit 64 specifies the degree of interest (the level 3).

At this time, if the above described motion is detected from the image data captured by the camera with the camera ID=3, the detection unit 64 is also able to refer to the camera installation DB 14 and specify that the captured location is the furniture selling section (bed). Then, the detection unit 64 refers to the commodity product DB 15 and specifies the bed as the commodity product corresponding to the commodity product size=large. As a result, the detection unit 64 specifies "the attribute of the commodity product=bed, and the degree of interest=trying/comparing (Compare)" as the combination of the attribute of the commodity product and the degree of interest.

Furthermore, if the motion of "the wrist coordinates frequently moving for a certain period of time" is detected from the image data captured by the camera with the camera ID=1, the detection unit 64 specifies the degree of interest in the commodity product size=small as the attribute of the commodity product. In other words, the detection unit 64 refers to the camera installation DB 14 and the commodity product DB 15, and specifies "the attribute of the commodity product=small item, and the degree of interest=trying/comparing (Compare)" as the combination of the attribute of the commodity product and the degree of interest.

Furthermore, if the motion of "the elbow coordinates and the wrist coordinates frequently moving a certain period of time" is detected from the image data captured by the camera with the camera ID=1, the detection unit 64 specifies the degree of interest in the commodity product size=medium as the attribute of the commodity product. In other words, the detection unit 64 refers to the camera installation DB 14 and the commodity product DB 15 and specifies "the attribute of the commodity product=baby sling, and the degree of interest=trying/comparing (Compare)" as the combination of the attribute of the commodity product and the degree of interest.

A description will be given here by referring back to FIG. 15. The notifying unit 65 is a processing unit that sends a notification to the store clerk terminal in the case where a customer highly effective in customer service is detected. Specifically, the notifying unit 65 transmits, to the store clerk terminal carried by the store clerk in charge of customer service, a message indicating a presence of a customer highly effective in customer service together with the name of the commodity product. For example, the notifying unit 65 transmits a message including "the name of the commodity product and the behavior" as the attribute of the commodity product and the degree of interest.

FIG. 19 is a diagram illustrating an example of a notification sent to a store clerk. As indicated by (a) illustrated in FIG. 19, if "the attribute of the commodity product=large size commodity product, and the degree of interest=trying/comparing (Compare)" is detected from the image data captured in the bed selling section, the notifying unit 65 transmits, to the store clerk terminal, the message indicating detection of the customer who is trying a large size commodity product in the bed selling section. Furthermore, as indicated by (b) illustrated in FIG. 19, if "the attribute of the commodity product=large size commodity product, and the degree of interest=trying/comparing (Compare)" are detected from the image data captured in the furniture selling section, the notifying unit 65 may simultaneously transmit both of the message and the image data to the store clerk terminal in the case where a customer who is trying a large size commodity product is detected in the furniture selling section.

Furthermore, the notifying unit 65 may transmit a message that is in accordance with the level of the detected degree of interest to the terminal used by the store clerk. For example, the notifying unit 65 may transmit further detailed message that specifies the customer or the commodity product as the level is higher. Furthermore, the notifying unit 65 may also send a notification indicating whether the degree of interest is high or low together with the message and may also transmit a message indicating the level of the visiting customer.

Furthermore, the notifying unit 65 may transmit a message indicating the presence of a customer highly effective in customer service together with the degree of interest that constitutes a combination. For example, in the above description, the notifying unit 65 transmits, to the terminal used by the store clerk, a message indicating that "the customer who is trying a large size commodity product is in the bed selling section. The degree of interest is (the level 3)".

Furthermore, the notifying unit 65 is able to include, in the message, various kinds of information, such as the selling section or the commodity product name, that is arbitrarily specified by the process described above. The notifying unit 65 is able to transmit, to the terminal used by the store clerk, the message indicating that "the customer who is trying a bed is in the bed selling section.", the message indicating that "the customer who desires a customer service is in the bed selling section.", the message indicating that "the customer who desires a customer service is in the bed selling section. The degree of interest is (the level 3)", or the like.

Flow of Process

Figure 20:
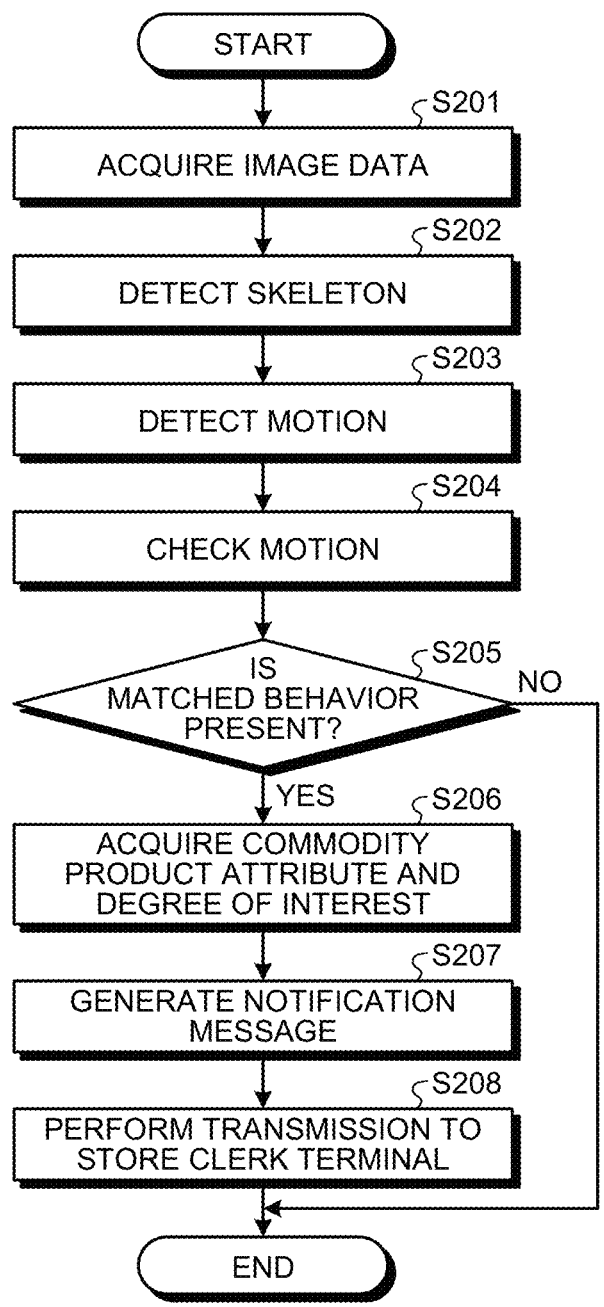
FIG. 20 is a flowchart illustrating the flow of a process performed in the customer service detection system according to the second embodiment.

FIG. 20 is a flowchart illustrating the flow of the process performed in the customer service detection system according to the second embodiment. As illustrated in FIG. 20, the information processing apparatus 10 acquires the image data (Step S201), and detects the skeleton information on the person from the image data (Step S202).

Then, the information processing apparatus 10 performs motion recognition on the basis of the skeleton information on the person. Specifically, the detection unit 64 specifies "the motion of the person based on a result of skeleton detection" from the image data (Step S203). After that, the information processing apparatus 10 checks the recognized motion against the detection rule. Specifically, the detection unit 64 refers to the detection rule DB 56 and checks a "type of a motion of a person performing on a commodity product" that is associated with the "motion based on a result of skeleton detection" (Step S204). If a matched behavior is present (Yes at Step S205), the detection unit 64 acquires the attribute (size) of the commodity product and the degree of interest (behavior) from the detection rule. Specifically, the detection unit 64 specifies, from the detection rule DB 56, "the combination of the attribute of the commodity product and the degree of interest" that is associated with the "type of the motion of the person performing on the commodity product" (Step S206).

Subsequently, the information processing apparatus 10 generates a notification message that uses the attribute (size) of the commodity product and the degree of interest (behavior). Specifically, the detection unit 64 refers to the camera installation DB 54, and then, specifies the "selling section" by using the camera ID that has captured the image of the person who performed the detected motion. After that, the detection unit 64 refers to the commodity product DB 55 and specifies the "attribute of the commodity product" and the "name of the commodity product" that are associated with the specified "selling section". Then, the detection unit 64 acquires, from the commodity product DB 55, the "name of the commodity product" corresponding to the "attribute of the commodity product" that constitutes the combination specified at Step S206. Furthermore, the detection unit 64 specifies "the degree of interest" constituting the combination specified at Step S206. The detection unit 64 generates a message indicating a customer highly effective in customer service together with the "selling section", the "name of the commodity product", and "the degree of interest" (Step S207). The information processing apparatus 10 transmits the generated message to the terminal used by the store clerk (Step S208). Furthermore, if a matched behavior is not present at Step S204 (No at Step S205), the information processing apparatus 10 ends the process without performing the process at Step S206.

Effects

As described above, the information processing apparatus 50 generates the skeleton information on the person from the image data, and detects a motion of the person from time series variations in the pose obtained from the generated skeleton information on the person. The information processing apparatus 50 acquires, for each combination of the attribute (size, use purpose, etc.) of the commodity product and the degree of interest in the commodity product, information in which the type of the motion of the person performing with respect to the commodity product is defined. The information processing apparatus 50 specifies the type of the motion associated with the detected motion performed by the person from among the type of the motions included in the acquired information, and then, specifies the attribute (size, use purpose) of the commodity product and the degree of interest in the commodity product that are associated with the specified type of the motion.

In other words, the information processing apparatus 50 is able to detect, by using the detection rule, the person exhibiting the behavior indicating an interest in the commodity product and notifies the store clerk of this state. Accordingly, the store clerk is able to offer, with priority, an advice to the customer having a high degree of interest. In contrast, the customer is able to make a purchase in a state in which a feeling of anxiety is reduced by receiving an advice from the store clerk even in a case in which the customer is undecided whether to purchase the commodity product or hesitates to ask about the commodity product.

Furthermore, the information processing apparatus 50 is able to specify the behaviors of a consumer in the store by applying a plurality of behavior processes (for example, AIDMA, etc.), which is known in the marketing field, leading up to a purchase made by the customer. For example, the information processing apparatus 50 is able to detect a customer highly effective in customer service on the basis of the detection rule in which Attention (stopping), Interest (looking and curiosity), Desire (picking up by hand), and Compare (trying) are evaluated in stages.

[c] Third Embodiment

Figure 21:
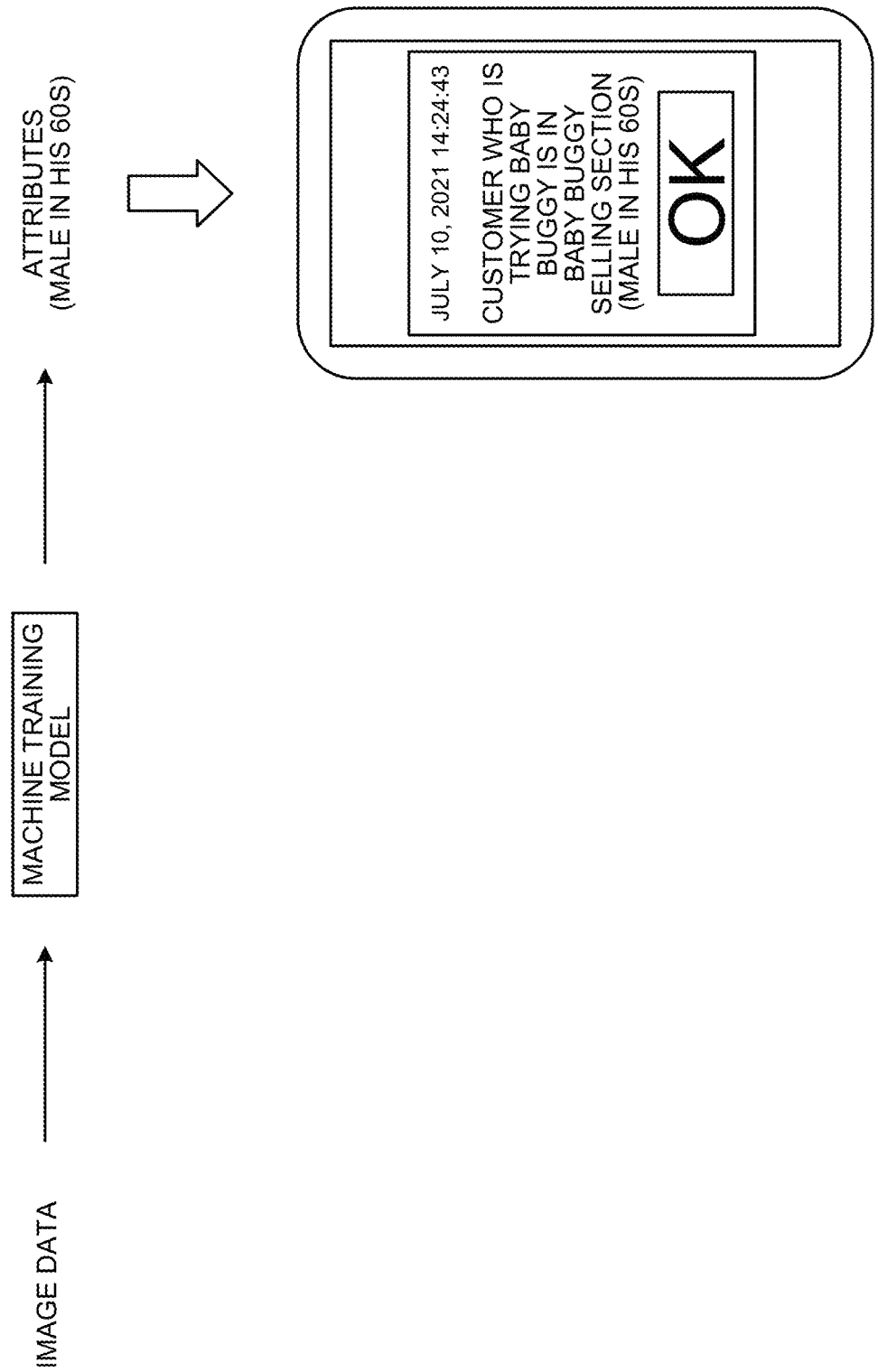
FIG. 21 is a diagram illustrating an example of a notification of attribute determination according to a third embodiment.
Figure 22:
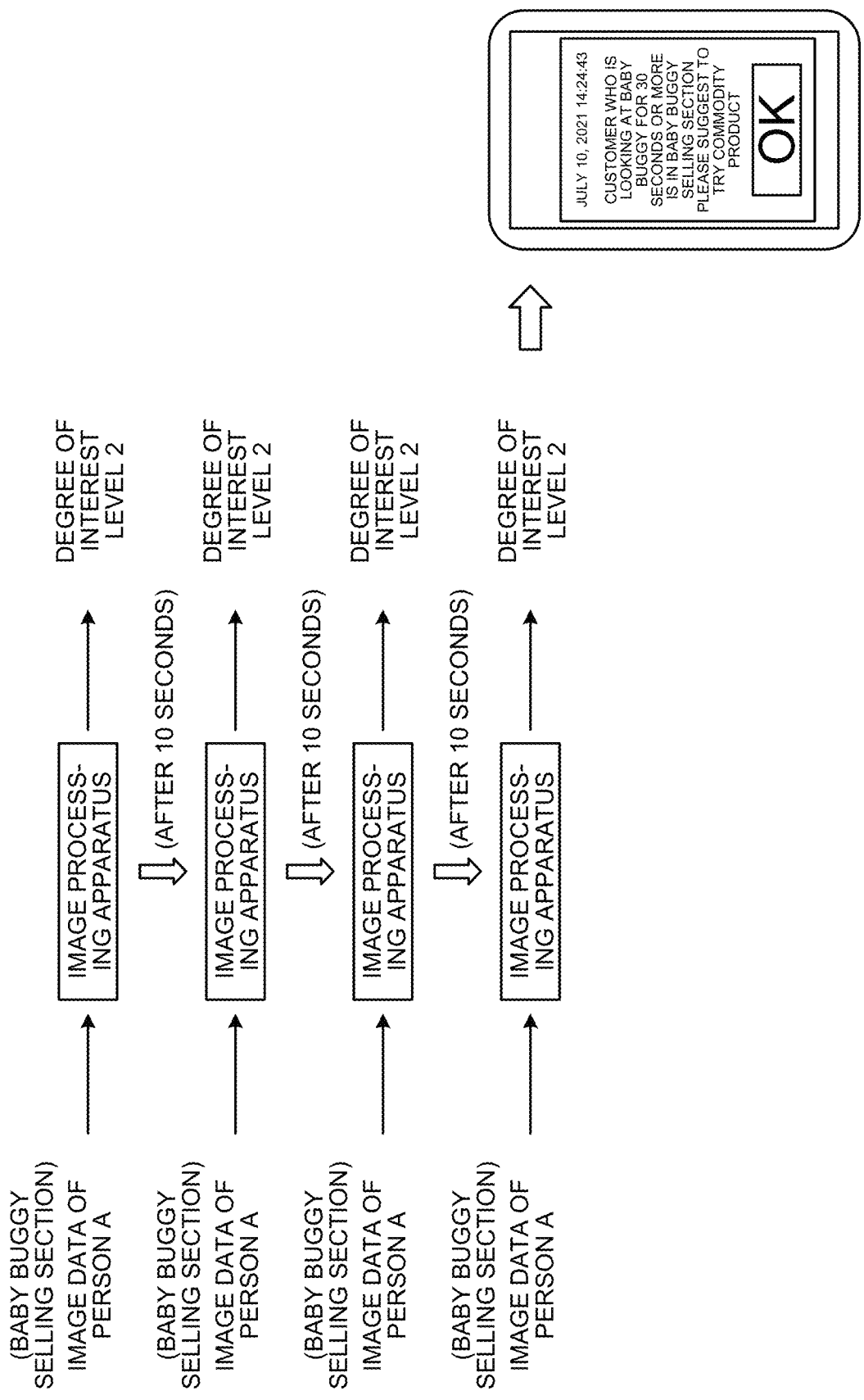
FIG. 22 is a diagram illustrating an example of a notification of consideration time of a commodity product according to the third embodiment.

Incidentally, the information processing apparatus 50 provides a wide range of variations in addition to the content described above in the second embodiment. Accordingly, in a third embodiment, a variation in the process performed by the information processing apparatus 50 will be described.
Detection Rule For example, in the second embodiment, a case has been described as one example in which the detection rule generated in the first embodiment is used; however, the example is not limited to this, and it is possible to use another detection rule that is generated by an administrator or the like. For example, the information processing apparatus 50 is also able to use the detection rule that is generated by using a past history, an analysis conducted by a statistical theory or the like, an experimental rule, or the like and in which the degree of interest is associated with each of a combination of a behavior of a person and a commodity product.
Attribute Determination For example, the information processing apparatus 50 is able to determine the attribute, such as age and gender, of the person included in the captured image and notify of the store clerk of the determination result. FIG. 21 is a diagram illustrating an example of notification of attribute determination according to the third embodiment. As illustrated in FIG. 21, the information processing apparatus 50 inputs, to a practiced machine training model, the attribute of the commodity product and the image data of the person who has performed the recognized motion, and then, acquires the attribute (male in his 60s) of the person included in the captured image. Then, the information processing apparatus 50 notifies the store clerk of the message indicating that "the customer who is trying a baby buggy is in the baby buggy selling section (male in his 60s)" including the attribute. As a result, the store clerk is able to provide a customer service after having acquired detailed information indicating whether or not a person who receives a present is interested in the commodity product, whether or not a person who actually uses is interested in the commodity product, or the like, so that the store clerk is able to provide an efficient customer service.
Notification of Consideration Time For example, if the same behavior is recognized across a plurality of frames, the information processing apparatus 50 is able to calculate commodity product consideration time taken for the customer and notify the store clerk of the calculated time. FIG. 22 is a diagram illustrating an example of a notification of the commodity product consideration time according to the third embodiment. As illustrated in FIG. 22, it is assumed that the information processing apparatus 50 detects, in the baby buggy selling section, the level 2 as the degree of interest from the image data that includes a captured person A. After that, it is assumed that the information processing apparatus 50 consecutively detects, for 30 seconds, the level 2 as the degree of interest from the image data that includes the person A captured in the baby buggy selling section. In this case, the information processing apparatus 50 may also notify the store clerk of the message indicating that "the customer who is looking at the baby buggy for 30 seconds or more is in the baby buggy selling section." including the consideration time.

At this time, the information processing apparatus 50 is able to transmit a message to proceeds to the subsequent step in consideration of the stages of Attention (stopping), Interest (looking and curiosity), Desire (picking up by hand), and Compare (trying). For example, the information processing apparatus 50 may also notify the store clerk of the message indicating that "the customer who is looking at the baby buggy for 30 seconds or more is in the baby buggy selling section. Please induce the customer to try the commodity product".

Figure 23:
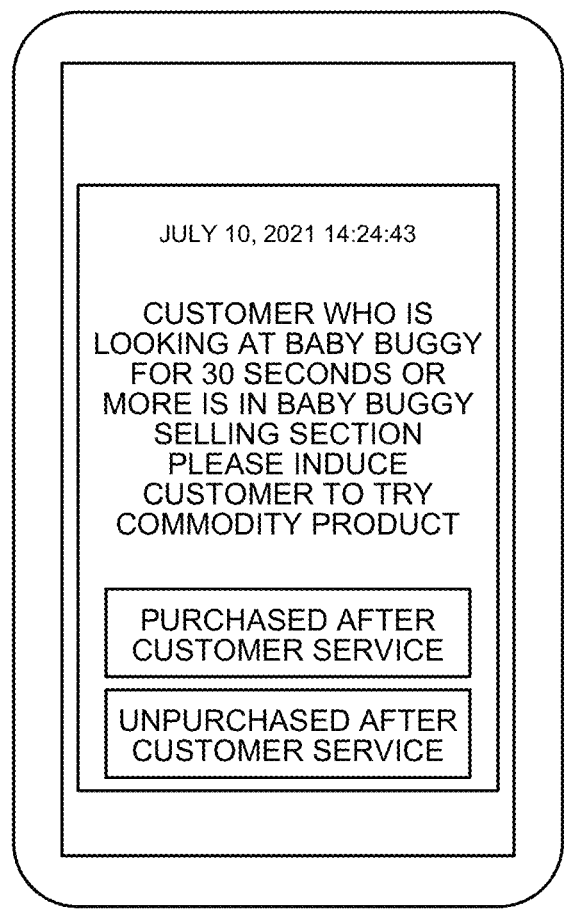
FIG. 23 is a diagram illustrating an example of a feedback of a customer service result according to the third embodiment.

As a result, the store clerk is able to grasp the state of the customer before the customer service and thus is able to provide an appropriate customer service.
Feedback For example, after having sent the notification to the terminal used by the store clerk, the information processing apparatus 50 is able to update the detection rule by collecting the feedbacks each indicating whether or not the customer actually purchased the commodity product and maintains the detection rule in optimal condition. FIG. 23 is a diagram illustrating an example of a feedback obtained from the customer service result according to the third embodiment. As illustrated in FIG. 23, the information processing apparatus 50 may also notify the store clerk of the screen for allowing the store clerk to select "purchase after the customer service or unpurchased after the customer service" together with the message indicating that "the customer who is looking at the baby buggy for 30 seconds or more in the baby buggy selling section. Please induce the customer to try the commodity product".

Then, the information processing apparatus 50 is able to maintain the detection rule in accordance with the actual status by increasing the level of the detection rule, in which a feedback has been given on the "purchase has been made after the customer service" by an amount equal to or greater than a threshold, by one or by decreasing the level of the detection rule, in which a feedback has been given on the "purchase is not made after the customer service" by an amount equal to or greater than the threshold, by one.

Purchasing Analysis

Furthermore, by conducting the purchasing analysis by checking the POS data in the checkout counter against the behavior history, the information processing apparatus 50 is able to check which behavior of the degree of interest has been led to the purchase and induce a customer service at the degree of interest one step before, thus leading to the purchase.

Figure 24:
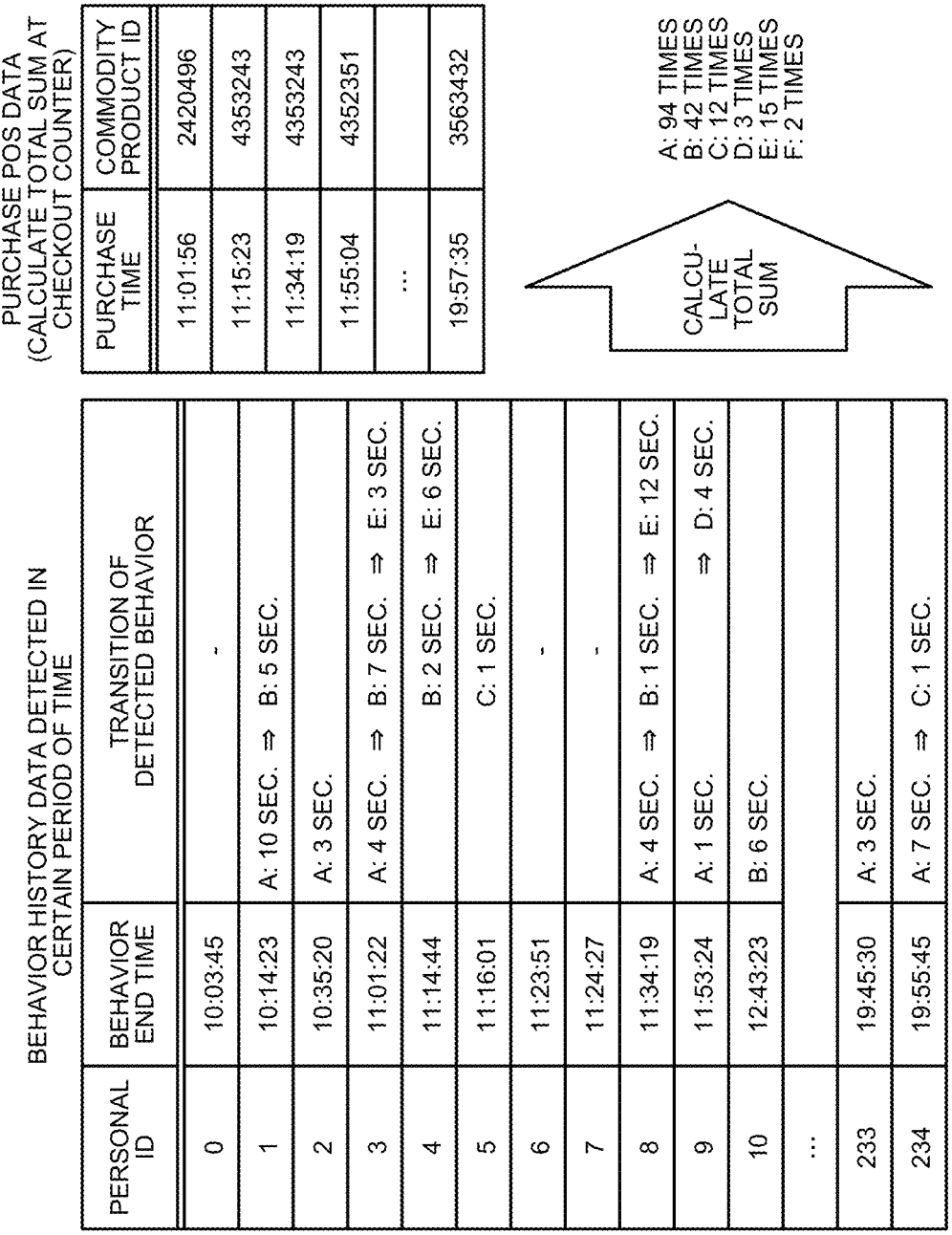
FIG. 24 is a diagram illustrating is a diagram illustrating an example of a purchase behavior analysis.

FIG. 24 is a diagram illustrating an example of a purchase behavior analysis. As illustrated in FIG. 24, the information processing apparatus 50 collects history data on the behaviors detected for a certain period of time and the POS data that indicates a purchase. Here, the history data on the behaviors detected for a certain period of time includes the personal ID for specifying the recognized person, the behavior end time indicating the time at which a series of the behavior recognition is ended, and the transition of the detected behavior. For example, FIG. 24 indicates that a person with the personal ID=1 performs a behavior A for 10 seconds and then performs a behavior B for 5 seconds, and indicates that the time at which the behavior B is ended is "10:14:23". Here, the behavior A or the behavior B correspond to "looking", "picking up by hand", "trying", or the like described above.

Then, the information processing apparatus 50 accumulates the history data on the behaviors, and counts the behavior A as 4 times, the behavior B as 42 times, a behavior C as 12 times, a behavior D as 3 times, a behavior E as 15 times, and a behavior F as 2 times. Subsequently, the information processing apparatus 50 checks the history data on the behaviors against the POS data and associates the clock time of the behavior with the purchase time that is indicated in the POS data and that is closer to the clock time of the behavior. In addition, determination of the closer association items is able to determine on the basis of whether or not a difference between both of the clock time is less than a threshold.

For example, the information processing apparatus 50 specifies, in the history data on the behaviors, that the person with the personal ID=3 exhibited "the behavior A (4 seconds), the behavior B (7 seconds), and the behavior E (3 seconds)" at "11:01:22". Furthermore, the information processing apparatus 50 specifies, in the POS data, that the commodity product with the commodity product ID=2420496 was purchased at "11:01:56". As a result, the information processing apparatus 50 determines that the person exhibited "the behavior A (4 seconds), the behavior B (7 seconds), and the behavior E (3 seconds)" purchased the commodity product with the commodity product ID=2420496.

Similarly, the information processing apparatus 50 specifies, in the history data on the behaviors, that the person with the personal ID=4 exhibited "the behavior B (2 seconds) and the behavior E (6 seconds)" at "11:14:44". Furthermore, the information processing apparatus 50 specifies, in the POS data, that the commodity product with the commodity product ID=43532443 was purchased at "11:15:23". As a result, the information processing apparatus 50 determines that the person exhibited "the behavior B (2 seconds) and the behavior E (6 seconds)" has purchased the commodity product with the commodity product ID=43532443.

As a result of the association process performed in this way, the information processing apparatus 50 specifies, from among the persons who exhibited the behavior up to the behavior E, the rate of the persons who actually make a purchase is equal to or greater than the threshold. Furthermore, the information processing apparatus 50 also specifies that the rate of the persons who exhibit the behavior B as a pre-behavior previous to the behavior E is equal to or greater than the threshold. As a result, if a person exhibiting the behavior B is detected as a result of specifying that a person exhibited the behaviors up to the behavior E purchases a large amount of commodity products and specifying that many persons who exhibit the behavior B also exhibit the behavior E, the information processing apparatus 50 is also able to notify the store clerk of the message that induces the person to behave the behavior E.

As described above, the information processing apparatus 50 is able to specify the time series of the behaviors and make efficient use the behaviors as the detection rule. As a result, the information processing apparatus 50 is able to detect a customer more highly effective in customer service, so that the information processing apparatus 50 is able to improve the sales and is able to improve the rate of attracting customers because it is possible to provide meticulous services to the customer service.

[d] Fourth Embodiment

In the above explanation, a description has been given of the embodiments according to the present invention; however, the present invention may also be implemented with various kinds of embodiments other than the embodiments described above.

Application Example

In the embodiments described above, a case has been described as an example of the image data; however, the example is not limited to this and moving image data may also be similarly used for the processes. Furthermore, in the second embodiment, a case has been described as an example of the customer service detection that uses the detection rule; however, the example is not limited to this. The information processing apparatus 50 is also able to decide the degree of interest of a person expressing with respect to a commodity product on the basis of the combination of the behavior of the person and the commodity product. In other words, the information processing apparatus 50 is also able to use the reference in which a behavior, a commodity product, and the degree of interest are associated with each other.

Example of Numerical Value

The data example, numerical value example, information on each of the DBs, the number of frames, the number of levels, the number of behaviors, the example of the behaviors, the association relationship between the motions and the skeleton information, and the like used above in the above described embodiments are only examples and are able to be arbitrarily changed. Furthermore, as the attribute of the commodity product, the size of the commodity product or the type of the commodity product are used as examples; however, the examples are not limited to these, and it is also possible to use a use purpose of the commodity product or the like.

System

The flow of the processes, the control procedures, the specific names, and the information containing various kinds of data or parameters indicated in the above specification and drawings can be arbitrarily changed unless otherwise stated.

Furthermore, the specific shape of a separate or integrated device is not limited to the drawings. For example, the information processing apparatus 10 and the information processing apparatus 50 may be implemented by the same housing. In other words, all or part of the device can be configured by functionally or physically separating or integrating any of the units in accordance with various loads or use conditions. In addition, all or any part of each of the processing functions performed by the each of the devices can be implemented by a CPU and by programs analyzed and executed by the CPU or implemented as hardware by wired logic.

Hardware

Figure 25:
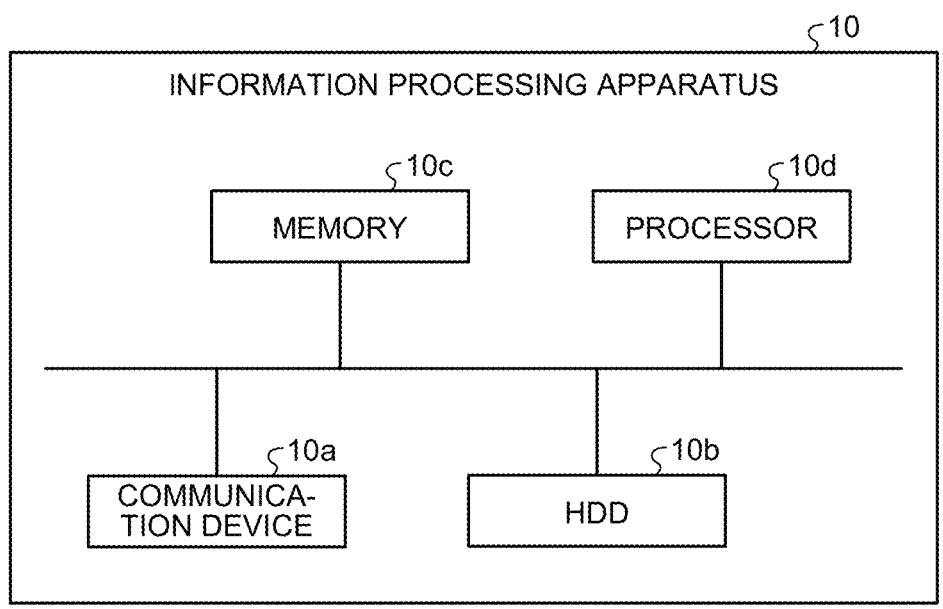
FIG. 25 is a diagram illustrating an example of a hardware configuration.

FIG. 25 is a diagram illustrating an example of a hardware configuration. Here, a description will be given by using the information processing apparatus 10 as an example, the same applies to the information processing apparatus 50. As illustrated in FIG. 25, the information processing apparatus 10 includes a communication device 10a, a hard disk drive (HDD) 10b, a memory 10c, and a processor 10d. Furthermore, the units illustrated in FIG. 25 are connected with each other by a bus or the like.

The communication device 10a is a network interface card or the like and communicates with another device. The HDD 10b stores therein the programs and the DB that operate the functions illustrated in FIG. 2.

The processor 10d operates the process that executes each of the functions described above in FIG. 2 or the like by reading the programs that execute the same process as that performed by each of the processing units illustrated in FIG. 2 from the HDD 10b or the like and loading the read programs in the memory 10c. For example, the process executes the same functions as those performed by each of the processing units included in the information processing apparatus 10. Specifically, the processor 10d reads, from the HDD 10b or the like, the programs having the same functions as those performed by the image capturing unit 21, the tracking unit 22, the skeleton detection unit 23, the motion recognition unit 24, the detection rule generating unit 25, and the like. Then, the processor 10d executes the process for executing the same processes as those performed by the image capturing unit 21, the tracking unit 22, the skeleton detection unit 23, the motion recognition unit 24, the detection rule generating unit 25, and the like.

In this way, the information processing apparatus 10 is operated as an information processing apparatus that executes an information processing method by reading and executing the programs. Furthermore, the information processing apparatus 10 is also able to implement the same functions as those described above in the embodiments by reading the above described programs from a recording medium by a medium reading device and executing the read programs. Furthermore, the programs described in another embodiment are not limited to be executed by the information processing apparatus 10. For example, the above described embodiments may also be similarly used in a case in which another computer or a server executes a program or in a case in which another computer and a server cooperatively execute the program with each other.

The programs may be distributed via a network, such as the Internet. Furthermore, the programs may be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

According to an aspect of the embodiments, it is possible to detect a customer highly effective in customer service.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:
    detecting a person and a commodity product from image data captured by a camera that is installed in each of selling sections;
    acquiring, from a machine learning model that inputs thereto the image data in which the person and the commodity product are detected, a position of a skeleton of the person included in skeleton information on the detected person;
    specifying, based on a transition of the position of the skeleton of the person for each of a plurality of consecutive frames within the image data, a behavior of the person exhibiting with respect to the commodity product;
    specifying, based on the specified behavior and information stored in a first storage unit wherein the information associates a type of a motion of a person performing with respect to a commodity product with a combination of an attribute value range of the commodity product and a degree of interest in the commodity product, the combination, wherein
        the attribute has a plurality of attribute value ranges;
        the type of a motion for a particular attribute value range corresponds to the specified behavior and an attribute value range for a commodity product is specified by referring to commodity product database including for each of commodity products, a selling section whose image data is captured by a camera installed therein, and an attribute range of the commodity product, the commodity product being specified by an image capturing region of the camera and coordinates of the commodity product within the image capturing region; and
    generating a detection rule for detecting a degree of interest based on a motion associated with each of the combinations of the behaviors and the attribute value range of the respective commodity products.

2. The non-transitory computer-readable recording medium according to claim 1, wherein the attribute of the commodity product is a size of the commodity product.

3. The non-transitory computer-readable recording medium according to claim 1, wherein the degree of interest in the commodity product includes a degree of interest that is associated with at least one of a behavior of looking at the commodity product, a behavior of picking up the commodity product, and a behavior of trying the commodity product.

4. The non-transitory computer-readable recording medium according to claim 1, wherein the process further includes:
specifying a selling section of the commodity product by using identification information on a camera that captures an image of the person;
referring to a second storage that stores therein information in which the selling section of the commodity product, the attribute of the commodity product, and a name of the commodity product are associated with each other;
specifying the attribute of the commodity product and the name of the commodity product that are associated with the specified selling section of the commodity product; and
specifying, based on the specified attribute of the commodity product and the specified name of the commodity product, the name of the commodity product associated with the attribute of the commodity product constituting the specified combination.

5. The non-transitory computer-readable recording medium according to claim 4, wherein the process further includes transmitting, to a store clerk terminal carried by a store clerk in charge of customer service, a message indicating a presence of a customer highly effective in customer service together with the commodity product.

6. The non-transitory computer-readable recording medium according to claim 4, wherein the process further includes transmitting, to a store clerk terminal carried by a store clerk in charge of customer service, a message indicating a presence of a customer highly effective in customer service together with the selling section of the commodity product.

7. The non-transitory computer-readable recording medium according to claim 1, wherein the process further includes transmitting, to a store clerk terminal carried by a store clerk in charge of customer service, a message indicating the presence of a customer highly effective in customer service together with the degree of interest constituting the combination.

8. The non-transitory computer-readable recording medium according to claim 1, wherein the process further includes transmitting, to a store clerk terminal carried by a store clerk in charge of customer service, a notification message using the attribute of the commodity product and the degree of interest in the commodity product.

9. An information processing method executed by a computer, the generation method comprising:
detecting a person and a commodity product from image data captured by a camera that is installed in each of selling sections;
acquiring, from a machine learning model that inputs thereto the image data in which the person and the commodity product are detected, a position of a skeleton of the person included in skeleton information on the detected person;
specifying, based on a transition of the position of the skeleton of the person for each of a plurality of consecutive frames within the image data, a behavior of the person exhibiting with respect to the commodity product; and
specifying, based on the specified behavior and information stored in a first storage unit wherein the information associates a type of a motion of a person performing with respect to a commodity product with a combination of an attribute value range of the commodity product and a degree of interest in the commodity product, the combination, wherein
the attribute has a plurality of attribute value ranges;
the type of a motion for a particular attribute value range corresponds to the specified behavior and an attribute value range for a commodity product is specified by referring to commodity product database including for each of commodity products, a selling section whose image data is captured by a camera installed therein, and an attribute range of the commodity product, the commodity product being specified by an image capturing region of the camera and coordinates of the commodity product within the image capturing region; and
generating a detection rule for detecting a degree of interest based on a motion associated with each of the combinations of the behaviors and the attribute value range of the respective commodity products using a processor.

10. An information processing apparatus comprising:
a memory; and
a processor coupled to the memory and configured to:
detect a person and a commodity product from image data captured by a camera that is installed in each of selling sections;
acquire, from a machine learning model that inputs thereto the image data in which the person and the commodity product are detected, a position of a skeleton of the person included in skeleton information on the detected person;
specify, based on a transition of the position of the skeleton of the person for each of a plurality of consecutive frames within the image data, a behavior of the person exhibiting with respect to the commodity product; and
specify, based on the specified behavior and information stored in a first storage unit wherein the information associates a type of a motion of a person performing with respect to a commodity product with a combination of attribute value range of the commodity product and a degree of interest in the commodity product, the combination, wherein
the attribute has a plurality of attribute value ranges;
the type of a motion for a particular attribute value range corresponds to the specified behavior and an attribute value range for a commodity product is specified by referring to commodity product database including for each of commodity products, a selling section whose image data is captured by a camera installed therein, and an attribute range of the commodity product, the commodity product being specified by an image capturing region of the camera and coordinates of the commodity product within the image capturing region; and
generate a detection rule for detecting a degree of interest based on a motion associated with each of the combinations of the behaviors and the attribute value range of the respective commodity products.

* * * * *